(12) United States Patent
Iida et al.

(10) Patent No.: US 8,112,991 B1
(45) Date of Patent: Feb. 14, 2012

(54) HYDROSTATIC TRANSMISSION

(75) Inventors: Masaru Iida, Amagasaki (JP); Kenta Sashikuma, Amagasaki (JP); Hiroshi Sugimoto, Amagasaki (JP); Shinichi Hirose, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 703 days.

(21) Appl. No.: 12/323,683

(22) Filed: Nov. 26, 2008

(51) Int. Cl.
*F16D 39/00* (2006.01)
*F16D 31/00* (2006.01)

(52) U.S. Cl. .......................................... 60/487; 60/488

(58) Field of Classification Search .................. 60/487, 60/488
See application file for complete search history.

(56) References Cited

U.S. PATENT DOCUMENTS

| 6,109,032 A * | 8/2000 | Shimizu et al. ................. 60/487 |
| 6,739,128 B2 * | 5/2004 | Boyer et al. .................... 60/468 |
| 7,127,890 B2 * | 10/2006 | Abend et al. .................... 60/487 |

* cited by examiner

*Primary Examiner* — Thomas E Lazo
(74) *Attorney, Agent, or Firm* — Sterne, Kessler, Goldstein & Fox, P.L.L.C.

(57) ABSTRACT

A hydrostatic transmission includes a hydraulic pump, a hydraulic motor, and a center section. The center section is formed therein with first and second fluid passages connecting kidney ports opened at a pump mounting surface to kidney ports opened at a motor mounting surface. The first and second fluid passages include respective straight portions parallel to the pump mounting surface and the motor mounting surface. When the center section is viewed to face the motor mounting surface, the straight portions of the first and second fluid passages substantially entirely overlap each other. When the center section is viewed to face the pump mounting surface, the straight portion of the first fluid passage is disposed between both ends of the second fluid passage, so that the straight portion of the first fluid passage and the ends of the second fluid passage are aligned on a substantially straight line.

6 Claims, 30 Drawing Sheets

HYDROSTATIC TRANSMISSION

BACKGROUND OF THE INVENTION

1. Field of the Invention

The present invention relates to a hydrostatic stepless transmission (hereinafter, referred to as "HST") including a hydraulic pump, a hydraulic motor and a center section, wherein the hydraulic pump and motor are mounted on the center section and are fluidly connected to each other through a pair of fluid passages formed in the center section.

2. Related Art

A typical conventional integral hydrostatic transaxle, i.e., IHT, includes a transaxle housing incorporating a HST and an axle, wherein hydraulic pump and motor, constituting the HST, are mounted on a center section so as to have respective rotary axes perpendicular to each other. When this NT is installed in a vehicle, e.g., a mower tractor, having a vertical crankshaft engine, typically, a vertical pump shaft serving as the rotary axis of the hydraulic pump is drivingly connected to an engine output shaft through a belt transmission.

The engine of the mower tractor is desired to be lowered to have a low center of gravity so that the mower tractor can travel stably. However, a sufficient ground clearance must be ensured even if the IHT drivingly connected to the vertical crankshaft engine through the belt transmission is lowered to correspond to the lowered engine. For example, it is suggested that the center section is vertically thinned to ensure the sufficient ground clearance under the lowered IHT. However, the IHT is also desired to be horizontally minimized. Thus, the center section is desired to be minimized vertically as well as horizontally. To achieve such a center section, how to shape the fluid passages in the center section is significant.

SUMMARY OF THE INVENTION

An object of the invention is to provide an HST including a hydraulic pump, a hydraulic motor and a center section, the rotary axes of the hydraulic pump and motor being perpendicular to each other, wherein the HST is minimized by improving fluid passages in the center section to minimizing the center section in the axial direction of a pump shaft and in the axial direction of a motor shaft.

To attain this object, a hydrostatic transmission according to the invention comprises a hydraulic pump, a hydraulic motor and a center section. The center section is shaped with a pump mounting surface, a motor mounting surface, first, second, third and fourth kidney ports and first and second fluid passages. The hydraulic pump is mounted on the pump mounting surface, and the hydraulic motor is mounted on the motor mounting surface. The motor mounting surface is extended perpendicular to the pump mounting surface so that an imaginary extension surface from the motor mounting surface intersects the pump mounting surface. The first and second kidney ports are opened at the pump mounting surface. The first and second kidney ports are aligned opposite to each other perpendicular to the extension direction of the imaginary extension surface so as to have the imaginary extension surface therebetween. The third and fourth kidney ports are opened at the motor mounting surface. The third and fourth kidney ports are aligned opposite to each other along the extension direction of the imaginary extension surface. The third kidney port is closer to the pump mounting surface than the fourth kidney port.

The first fluid passage is interposed between the first and third kidney ports. The second fluid passage is interposed between the second and fourth kidney ports. The first fluid passage has a first end joined to the first kidney port, and has a second end joined to the third kidney port. The second fluid passage has a third end joined to the second kidney port, and has a fourth end joined to the fourth kidney port.

In a first aspect of the center section, the entire first fluid passage between the first and second ends, when viewed to face the motor mounting surface, is straight and parallel to the pump mounting surface. The second fluid passage includes a straight portion extended parallel to the pump mounting surface and the motor mounting surface. A portion of the first fluid passage ranged along the motor mounting surface to the second end, when viewed to face the motor mounting surface, entirely overlaps the straight portion of the second fluid passage.

Therefore, the center section is minimized (thinned) in the axial direction of the hydraulic pump so as to minimize the HST because the portion of the first fluid passage ranged along the motor mounting surface to the second end, when viewed to face the motor mounting surface, entirely overlaps the straight portion of the second fluid passage.

In the first aspect of the center section, preferably, a first neutral valve opened to the first fluid passage and a second neutral valve opened to the second fluid passage are installed. A portion of the second fluid passage between the third end and an end of the straight portion toward the third end is bent to avoid the first neutral valve when viewed to face the motor mounting surface.

Due to the above shape of the second fluid passage in the center section, the first and second neutral valves are optimally arranged to ensure the effect to expand the neutral zone of the HST, and a relief groove plate facing the neutral valves can be simply shaped, so that the HST and relevant components can be minimized and economized.

In a second aspect of the center section, the first fluid passage includes a first straight portion, a second straight portion and a curved portion. The first straight portion has one end serving as the first end of the first fluid passage joined to the first kidney port, and is extended straight from the first end parallel to the pump mounting surface. The first straight portion slantingly intersects the imaginary extension surface when viewed to face the pump mounting surface. The second straight portion has one end serving as the second end of the first fluid passage joined to the third kidney port, and is extended straight from the second end parallel to the pump mounting surface and the motor mounting surface. The curved portion is interposed between the other end of the first straight portion and the other end of the second straight portion. The entire first fluid passage between the first and second ends is doglegged at the curved portion when viewed to face the pump mounting surface, and is straight and parallel to the pump mounting surface when viewed to face the motor mounting surface. The second fluid passage includes a third straight portion, a first connection portion and a second connection portion. The third straight portion is extended parallel to the pump mounting surface and the motor mounting surface. The second straight portion of the first fluid passage is disposed between the third straight portion and the motor mounting surface. The first connection portion has one end serving as the third end of the second fluid passage joined to the second kidney port. The first connection portion is extended from the third end, and is curved to be joined to one end of the third straight portion when viewed to face the pump mounting surface. The second connection portion has one end serving as the fourth end of the second fluid passage joined to the fourth kidney port. The second connection portion is extended from the fourth end, and is curved to be joined to the other end of the third straight portion. The second straight portion of the first fluid passage, when viewed to face the motor mounting surface, substantially entirely overlaps the third straight portion of the second fluid passage. The second straight portion of the first fluid passage, when viewed to face the pump mounting surface, is disposed between the third and fourth ends of the second fluid passage, so that the second straight portion and the third and fourth ends are aligned substantially straight.

Therefore, the center section is minimized (thinned) in the axial direction of the hydraulic pump so as to minimize the HST because the second straight portion of the first fluid passage substantially entirely overlaps the straight portion of the second fluid passage when viewed to face the motor mounting surface. Further, the center section is minimized (narrowed) in the axial direction of the hydraulic motor so as to minimize the HST because the second straight portion of the first fluid passage, when viewed to face the pump mounting surface, is disposed between the third and fourth ends of the second fluid passage, so that the second straight portion and the third and fourth ends are aligned substantially straight.

In the second aspect of the center section, preferably, a first neutral valve opened to the first fluid passage and a second neutral valve opened to the second fluid passage are installed. The first neutral valve, when viewed to face the pump mounting surface, intersects the first connection portion of the second fluid passage. The first connection portion of the second fluid passage is bent to avoid the first neutral valve when viewed to face the motor mounting surface.

Due to the above shape of the second fluid passage in the center section, the first and second neutral valves are optimally arranged to ensure the effect to expand the neutral zone of the HST, and a relief groove plate facing the neutral valves can be simply shaped, so that the HST and relevant components can be minimized and economized.

Preferably, a transaxle includes a housing incorporating the hydrostatic transmission. In the transaxle, the center section, as either the first or second aspect, is arranged to have the pump mounting surface as a horizontal bottom surface thereof. A vertical pump shaft of the hydraulic pump mounted onto the pump mounting surface is passed through the center section, and is extended downwardly outward from the housing so as to be provided thereon with a pulley for the driving connection of the hydraulic pump to a prime mover. A charge pump housing incorporating a charge pump is mounted onto an upper surface of the center section. The pump shaft is extended into the charge pump housing so as to serve as a drive shaft of the charge pump. The charge pump housing is extended horizontally so as to form a filter support portion horizontally sidewise from the center section. A fluid filter is disposed in the housing and is supported by the filter support portion of the charge pump housing.

Therefore, while the pulley serving as an input pulley of the transaxle is disposed below the housing of the transaxle, a fluid filter can be disposed sidewise from the HST (in the radial direction of the pump shaft) by using a portion of the charge pump housing as the filter support portion, thereby minimizing the transaxle in the axial direction of the pump shaft.

These, other and further objects, features and advantages of the invention will appear more fully from the following description with reference to accompanying drawings.

DETAILED DESCRIPTION OF THE INVENTION

Referring to FIGS. 1 to 6, a center section 1 for a hydrostatic stepless transmission (HST) is configured according to a first embodiment. Center section 1 according to the first embodiment will be described on the assumption that center section 1 is arranged to have a horizontal upper surface 1a, a vertical left surface 1b and a vertical front surface 1c.

Figure 1:
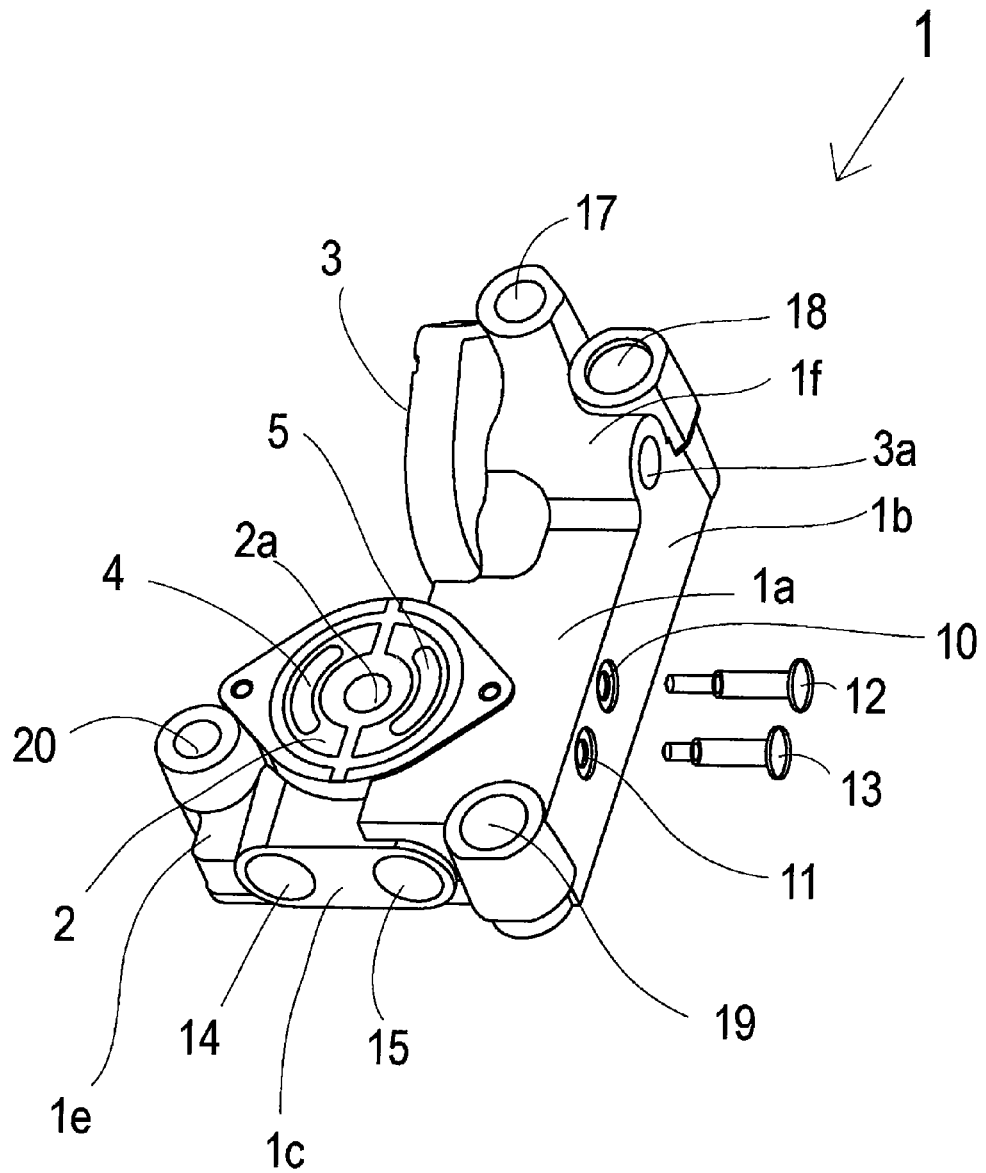
FIG. 1 is a perspective forwardly left view of a center section 1 for a hydrostatic transmission (HST) according to the present invention.
Figure 3:
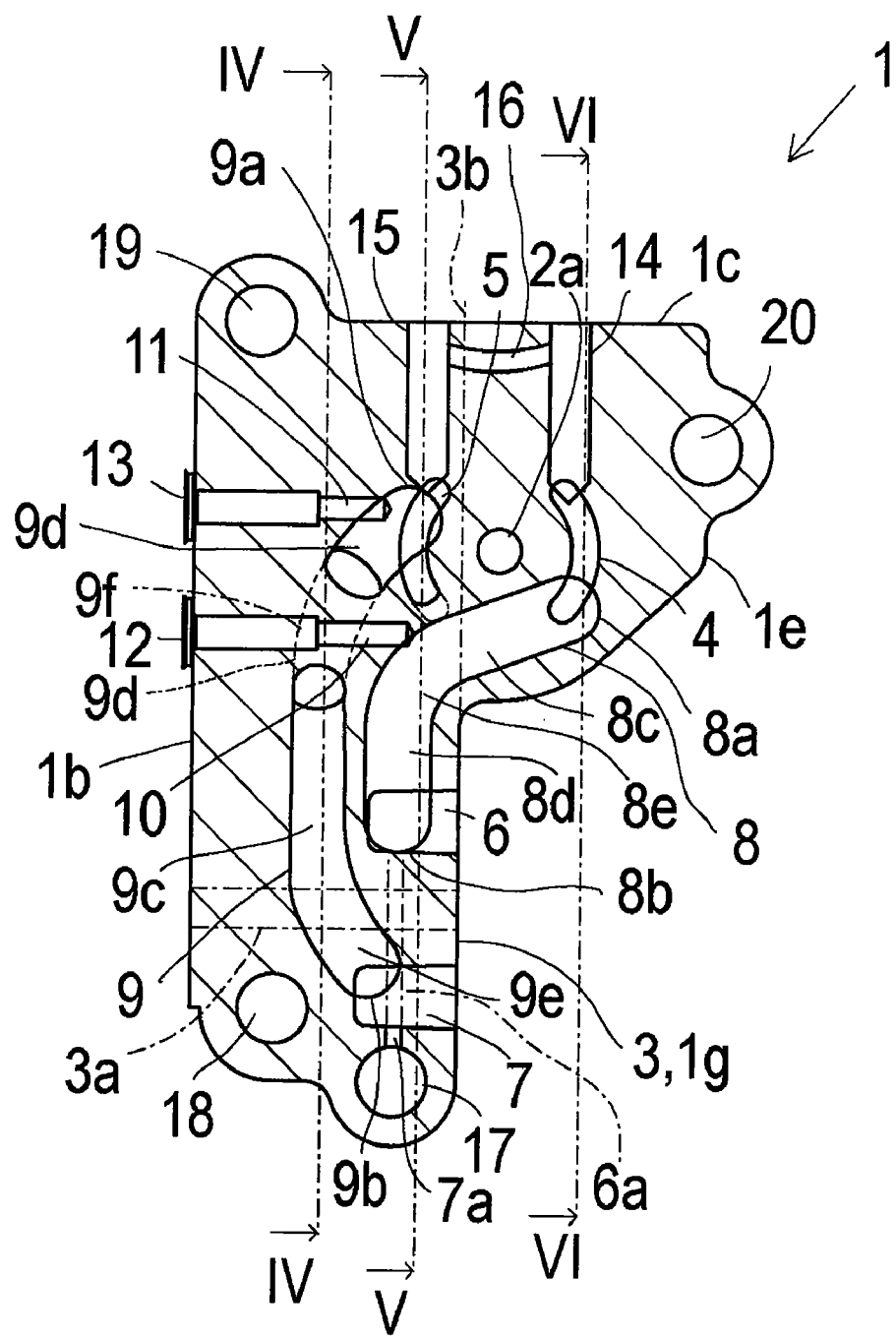
FIG. 3 is a sectional plan view of center section 1 according to a first embodiment.
Figure 4:
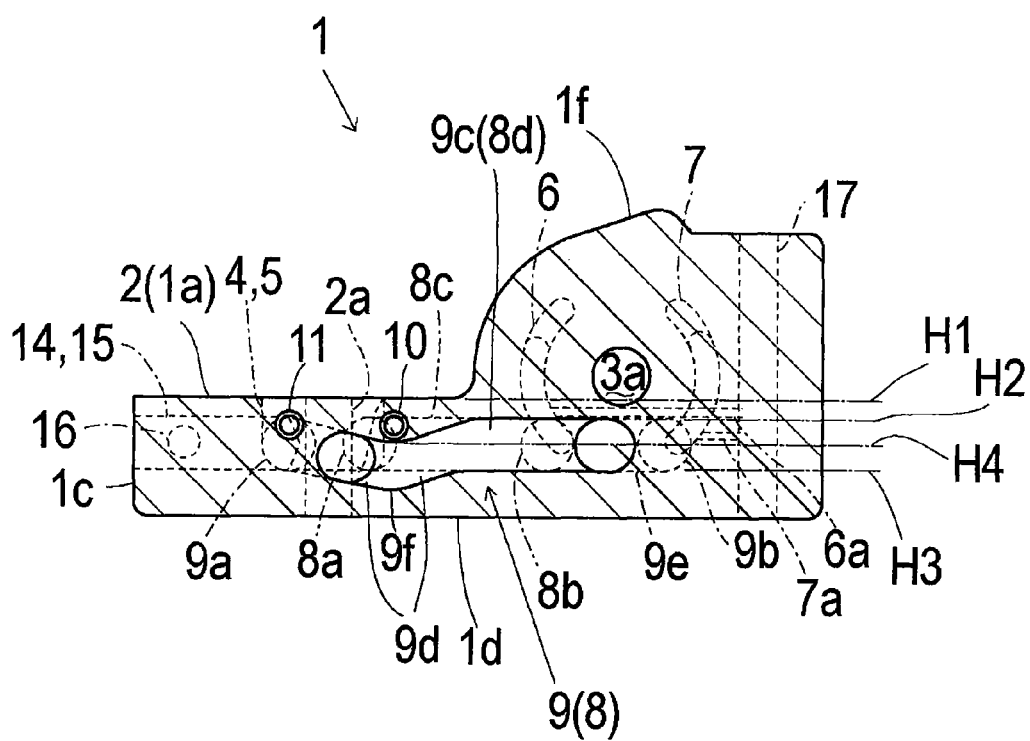
FIG. 4 is a cross sectional view of center section 1 according to the first embodiment taken along IV-IV line of FIG. 2.
Figure 5:
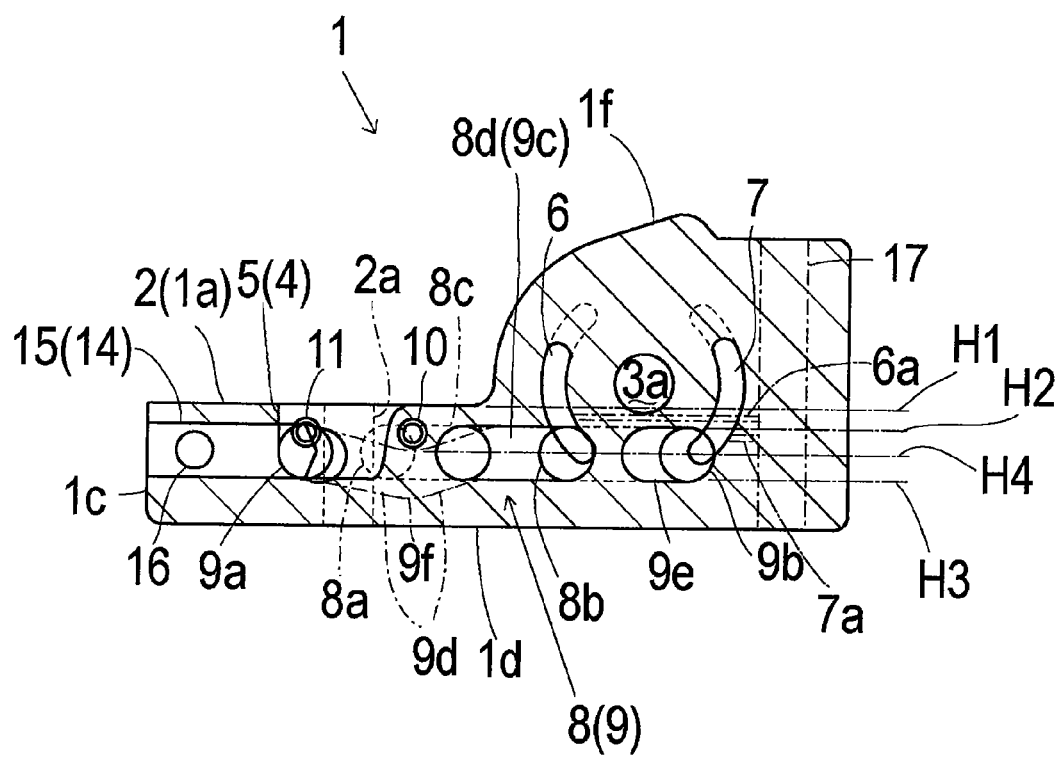
FIG. 5 is a cross sectional view of center section 1 according to the first embodiment taken along V-V line of FIG. 2.
Figure 6:
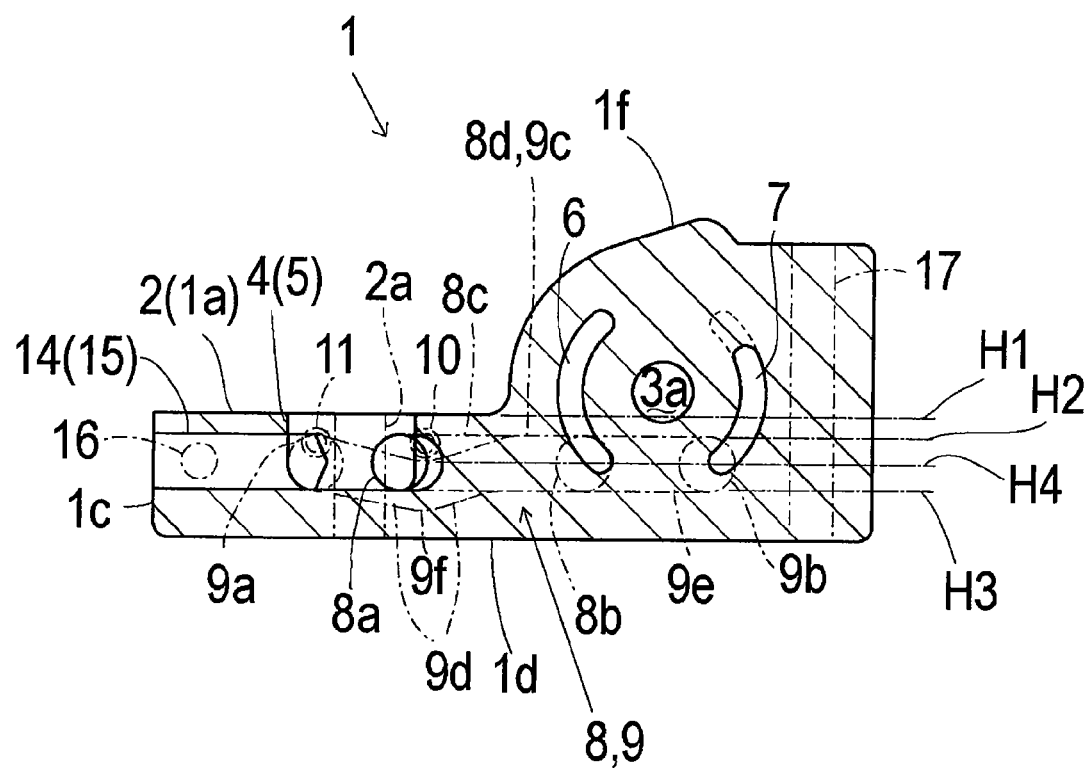
FIG. 6 is a cross sectional view of center section 1 according to the first embodiment taken along VI-VI line of FIG. 2.

An entire appearance of center section 1 will now be described. When viewed in plan, as shown in FIGS. 1 and 3, left surface 1b is extended in the substantially whole length of center section 1 between front and rear ends of center section 1 so as to be defined as the left end of center section 1, and front surface 1c is extended perpendicularly rightward from the front end of left surface 1b so as to be defined as the front end of center section 1. Horizontal bottom surface 1d substantially entirely covers the bottom end of center section 1.

A front portion of center section 1 is formed with a rightward expanded portion which is expanded along front surface 1c rightward from left surface 1b so as to include horizontal upper surface. A rightward portion of horizontal upper surface 1a serves as a horizontal pump mounting surface 2. A rear portion of center section 1 is formed with an upward expanded portion if which is expanded upward from horizontal upper surface 1a and is extended rearward along left surface 1b. The lateral width of the rear portion of center section 1 is shorter than that of the front portion of center section 1. Center section 1 includes a vertical surface 1g which is extended rearward from the rear end of rightward expanded portion 1e and parallel to left surface 1b so as to be defined as the right end of upward expanded portion 1f of center section 1. A rear portion of vertical surface 1g serves as a motor mounting surface 3. In this way, motor mounting surface 3 is close at the front end thereof to the rear end of pump mounting surface 2, and is extended rearward parallel to left surface 1b.

A vertical bolt hole 18 is bored through a rear end portion of upward expanded portion 1f of center section 1. A bolt hole 19 is bored through a left front corner portion of center section 1 between left surface 1b and front surface 1c. A vertical bolt hole 20 is bored through a right end portion of rightward expanded portion 1e. A vertical relief valve hole 17 is bored through another rear end portion of upward expanded portion 1f.

As mentioned above, both the front and rear portions of center section 1 are bordered at the left ends thereof by left surface 1b, and the rear portion of center section 1 is shorter in lateral width than the front portion of center section 1. Consequently, when viewed in plan, an imaginary extension surface 3b extended forward from motor mounting surface 3 formed on the right end of the rear portion of center section intersections pump mounting surface 2 formed on the front portion of center section 1.

A vertical pump shaft hole 2a penetrates rightward expanded portion 1e of center section 1 and is opened at the top end thereof in the center portion of pump mounting surface 2. In pump mounting surface 2, a first kidney port 4 is opened rightward from pump shaft hole 2a, and second kidney port 5 is opened leftward from pump shaft hole 2a, so that first and second kidney ports 4 and 5 are opened symmetrically with respect to pump shaft hole 2a. In other words, when viewed in plan, i.e., when center section 1 is viewed to face pump mounting surface 2, first and second kidney ports 4 and 5 are aligned opposite to each other with respect to pump shaft hole 2a in the direction perpendicular to the extension direction of imaginary extension surface 3b from motor mounting surface 3. First kidney port 4 is disposed in rightward expanded portion 1e rightward from imaginary extension surface 3b, and second kidney port 5 is disposed in center section 1 leftward from imaginary extension surface 3b. Pump shaft hole 2a is disposed rightward from imaginary extension surface 3b.

A laterally horizontal motor shaft hole 3a penetrates upward expanded portion 1f of center section 1 and is opened at the right end thereof in the center portion of motor mounting surface 3. In motor mounting surface 3, a third kidney port 6 is opened forward from motor shaft hole 3a, and fourth kidney port 7 is opened rearward from motor shaft hole 3a, i.e., third kidney port 6 is closer to pump mounting surface 2 than fourth kidney port 7, so that third and fourth kidney ports 6 and 7 are opened symmetrically with respect to motor shaft hole 3a. In other words, when viewed in right side, i.e., when center section 1 is viewed to face motor mounting surface 3, third and fourth kidney ports 6 and 7 are aligned opposite to each other with respect to motor shaft hole 3a in the fore-and-aft extension direction of motor mounting surface 3.

In center section 1, a first fluid passage 8 is formed to connect first and third kidney ports 4 and 6 to each other, and a second fluid passage 9 is formed to connect second and fourth kidney ports 5 and 7 to each other.

First fluid passage 8 has a front (first) end 8a joined to a rear end bottom of first kidney port 4, and has a rear (second) end 8b joined to a bottom of third kidney port 6. Entire first fluid passage 8 between front and rear ends 8a and 8b is evenly leveled at ceiling and bottom ends thereof. The horizontal ceiling of first fluid passage 8 is disposed at a second height H2 that is higher than a first height H1 of upper surface 1a. The horizontal bottom of first fluid passage 8 is disposed at a third height H3. Consequently, when viewed in side, i.e., when viewed to face motor mounting surface 3, entire first fluid passage 8 between front and rear ends 8a and 8b is straight and parallel to pump mounting surface 2.

In rightward expanded portion 1e, first fluid passage 8 includes a first straight portion 8c whose one end serves as front end 8a. First straight portion 8c is extended horizontally straight from front end 8a parallel to pump mounting surface 2 and along the rear end of rightward expanded portion 1e. When viewed in plan, first straight portion 8c is extended rearwardly leftward so as to slantingly intersect imaginary extension surface 3b. First fluid passage 8 includes a second straight portion 8d whose one end serves as rear end 8b. Second straight portion 8d is extended horizontally straight from rear end 8b along motor mounting surface 3 and vertical surface 1g, i.e., parallel to pump mounting surface 2 and motor mounting surface 3. Further, first fluid passage 8 includes a curved portion 8e which is curved along an angle between rightward expanded portion 1e and vertical surface 1g when viewed in plan. Curved portion 8e is interposed between the other end of first straight portion 8c and the other end of second straight portion 8d. Consequently, entire first fluid passage 8 between front and rear ends 8a and 8b is a doglegged passage when viewed in plan, i.e., when viewed to face pump mounting surface 2.

Second fluid passage 9 has a front (third) end 9a joined to a front end bottom of second kidney port 5, and has a rear (fourth) end 9b joined to a bottom of fourth kidney port 7. Entire second fluid passage 9 between front and rear ends 9a and 9b, excluding a later-discussed V-bent first connection portion 9d, has horizontal ceiling and bottom ends evenly leveled at respective heights equal to heights H2 and H3 of the ceiling and bottom of entire first fluid passage 8.

Installation of neutral valves 12 and 13 into center section 1 will now be described before detail description of second fluid passage 9 in structure. Front and rear neutral valve holes 10 and 11 are horizontally bored in center section 1 parallel to front surface 1c, and are opened at one ends thereof in left surface 1b. The heights of horizontal ceilings of neutral valve holes 10 and 11 are equal to each other and are substantially equal to second height H2. Neutral valve hole 10 is joined at the other end thereof to curved portion 8e of first fluid passage 8. Neutral valve hole 11 is joined at the other end thereof to second fluid passage 9 adjacent to front end 9a. Neutral valve 12 is fitted in neutral valve hole 10, neutral valve 13 is fitted in neutral valve hole 11, and neutral valves 12 and 13 are exposed at outer (left) ends thereof so as to project outward from left surface 1b, and are adapted to be pressed at the outer ends thereof against a relief groove plate 53 serving as a control arm for controlling a movable swash plate 27 of a hydraulic pump P in a later-discussed transaxle (NT). Neutral valves 12 and 13 have respective orifices opened at the respective outer ends thereof. Relief groove plate 53 is formed with at least one relief groove 53a opened to a fluid sump in the NT. The orifices of neutral valves 12 and 13 are closed at the outer ends thereof by relief groove plate 53 unless either of the orifices of neutral valves 12 and 13 is faced to relief groove 53a. When the orifice of neutral valve 12 or 13 is faced and opened to relief groove 53a, fluid is drained from corresponding first or second fluid passage 8 or 9 to the fluid sump through neutral valve 12 or 13 and relief groove 53a, thereby surely realizing the neutral state of an HST when the HST is operated to be neutralized.

Second fluid passage 9 will now be described again. Second fluid passage 9 includes a horizontal third straight portion 9c bored in center section 1 between second straight portion 8d of first fluid passage 8 and left surface 1b and parallel to second straight portion 8d and left surface 1b. Third straight portion 9c is extended horizontally parallel to pump mounting surface 2 and motor mounting surface 3 so as to have second height H2 at the ceiling thereof, and have third height H3 at the bottom thereof. Second straight portion 8d of first fluid passage 8 substantially entirely overlaps third straight portion 9c of second fluid passage 9 when viewed in side, i.e., when viewed to face motor mounting surface 3. In other words, when center section 1 is viewed to face motor mounting surface 3, the portion of first fluid passage 8 ranged along motor mounting surface 3 to rear (second) end 8b entirely overlaps third straight portion 9c of second fluid passage 9.

Second fluid passage 9 includes first connection portion 9d whose one end serves as front end 9a, and includes a second connection portion 9e whose one end serves as rear end 9b. When viewed in plan, i.e., when viewed to face pump mounting surface 2, first connection portion 9d is extended from front end 9a and is curved to be joined at the other (rear) end thereof to the front end of third straight portion 9c, and second connection portion 9e is extended from rear end 9b and is curved to be joined at the other (front) end thereof to the rear end of third straight portion 9c. When viewed in plan, i.e., when viewed to face pump mounting surface 2, neutral valve hole 10 appears to intersect first connection portion 9d. However, first connection portion 9d has a deepest portion 9f disposed vertically downward from neutral valve hole 10 so as to avoid neutral valve hole 10. Deepest portion 9f has a ceiling disposed at a fourth height H4 lower than second height H2. When viewed in side, i.e., when viewed to face motor mounting surface 3, first connection portion 9d is V-bent at deepest portion 9f, so as to be extended upwardly rearward from deepest portion 9f to the front end of third straight portion 9c and extended upwardly forward from deepest portion 9f to front end 9a.

Front and rear ends 9a and 9b of second fluid passage 9 have ceilings disposed at height H2, and have bottoms disposed at height H3. When viewed in plan, second straight portion 8d of first fluid passage 8 is disposed between front and rear ends 9a and 9b of second fluid passage 9 so that second straight portion 8d and front and rear ends 9a and 9b are aligned substantially on a common straight line.

As shown in FIG. 1, left and right charge valve holes 14 and 15 have respective rear ends opened at rear surface 1c and equally leveled. In center section 1, charge valve holes 14 and 15 are extended forward parallel to each other, charge valve hole 14 is joined at the front end thereof to a rear end of kidney port 4, and charge valve hole 15 is joined at the front end thereof to a rear end of second kidney port 5 (or to second fluid passage 9 adjacent to second kidney port 5). A connection passage 16 is formed in center section 1 to connect charge valve holes 14 and 15 to each other.

Figure 9:
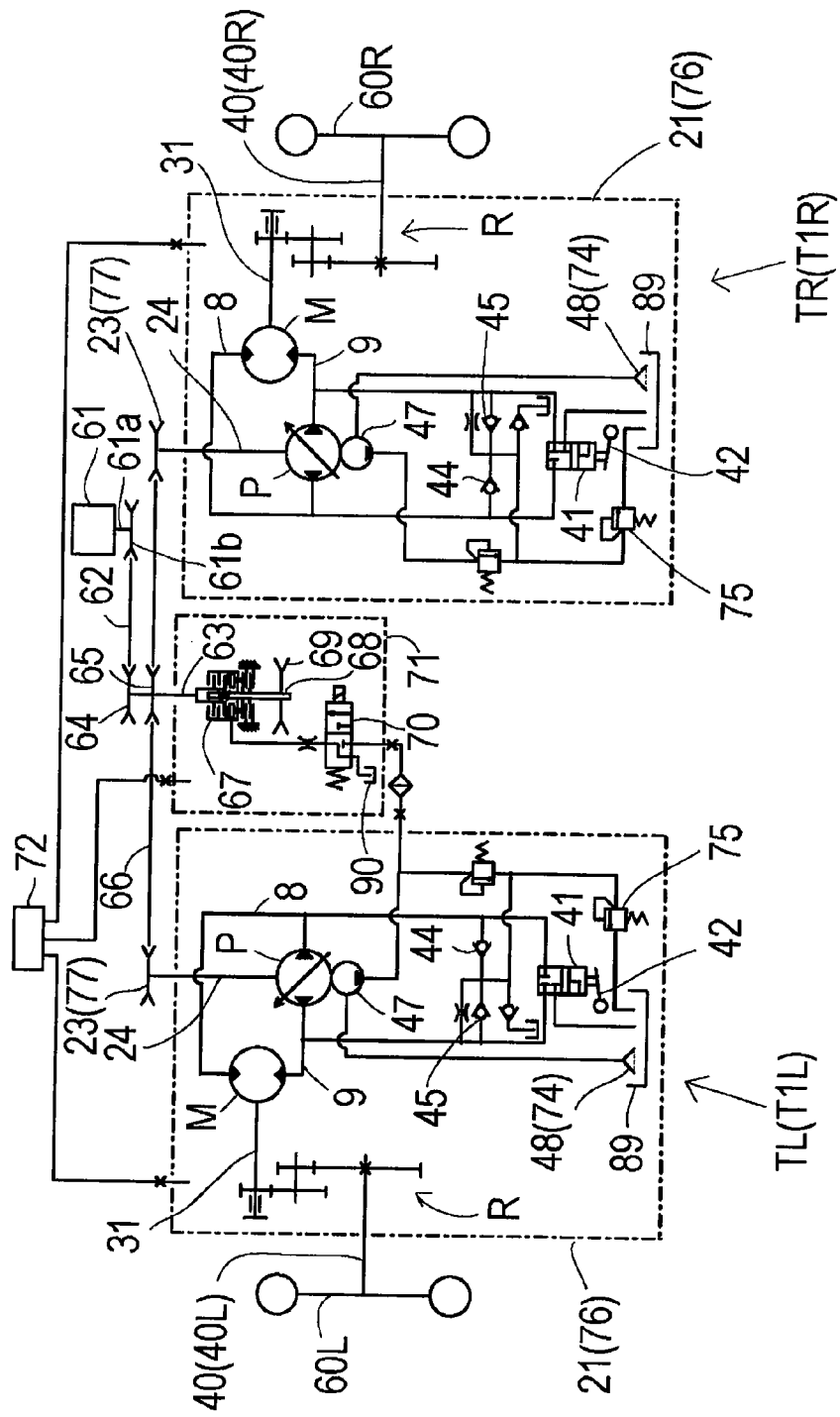
FIG. 9 is a skeleton diagram of a power transmission system including an engine, right and left transaxles T (or T1), and a working device driving clutch unit, wherein a belt transmission is provide to drivingly connect the engine to the right and left transaxles and the working device driving clutch unit.
Figure 11:
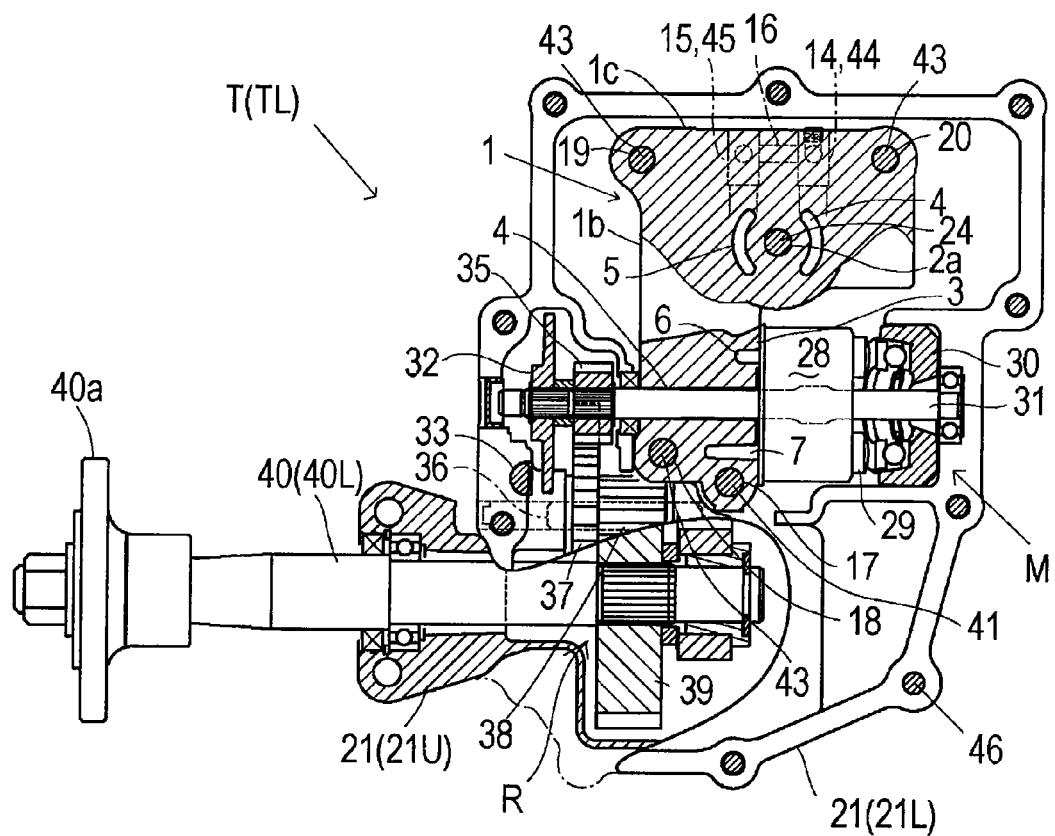
FIG. 11 is a plan view partly in section of transaxle T of FIG. 10 from which an upper housing half 21U has been removed.
Figure 12:
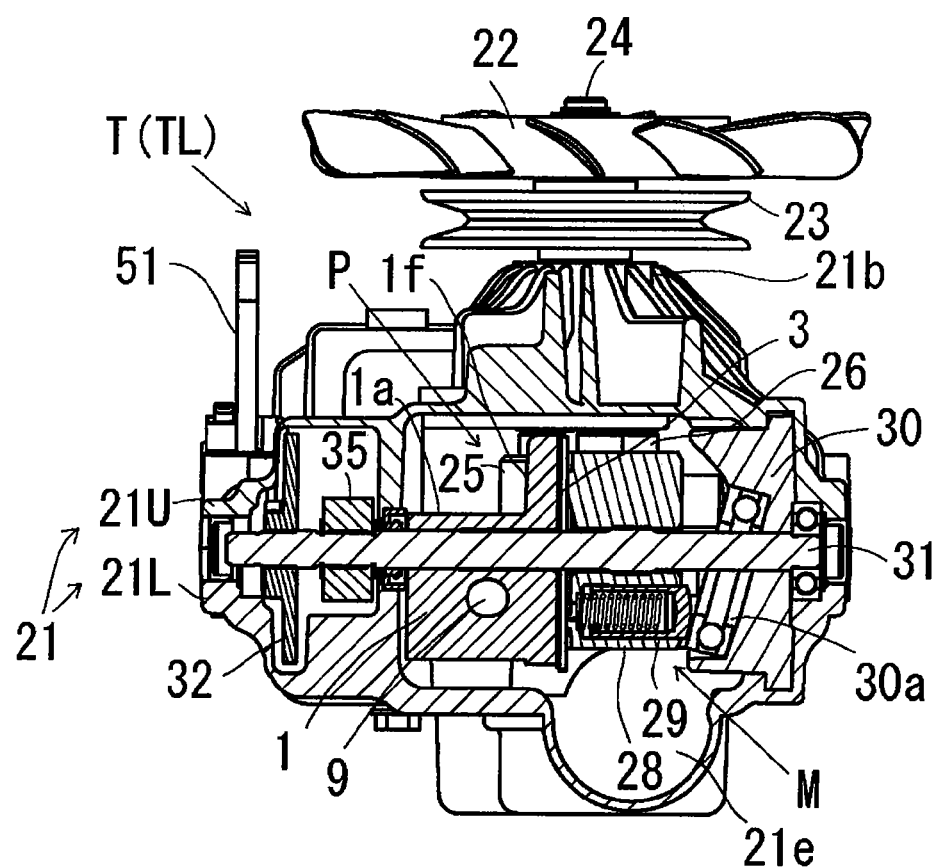
FIG. 12 is a cross sectional view of transaxle T taken along XII-XII line of FIG. 10.
Figure 17:
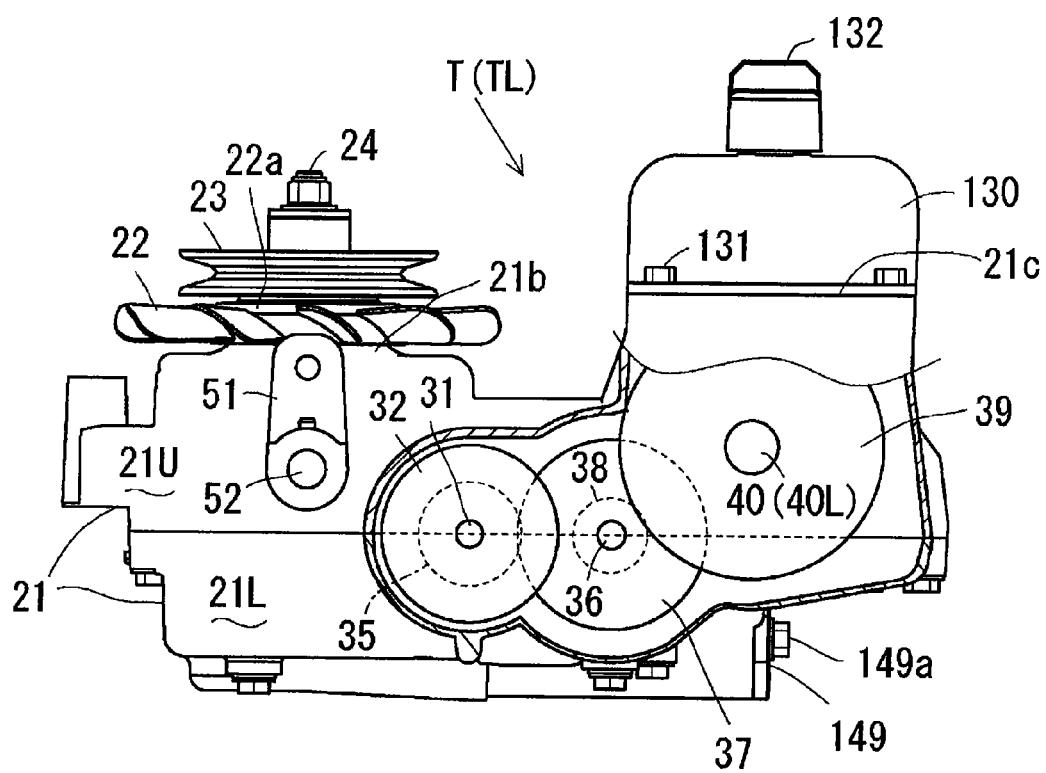
FIG. 17 is a side view partly in section of transaxle T whose transaxle housing is provided thereon with a separate reservoir tank.
Figure 18:
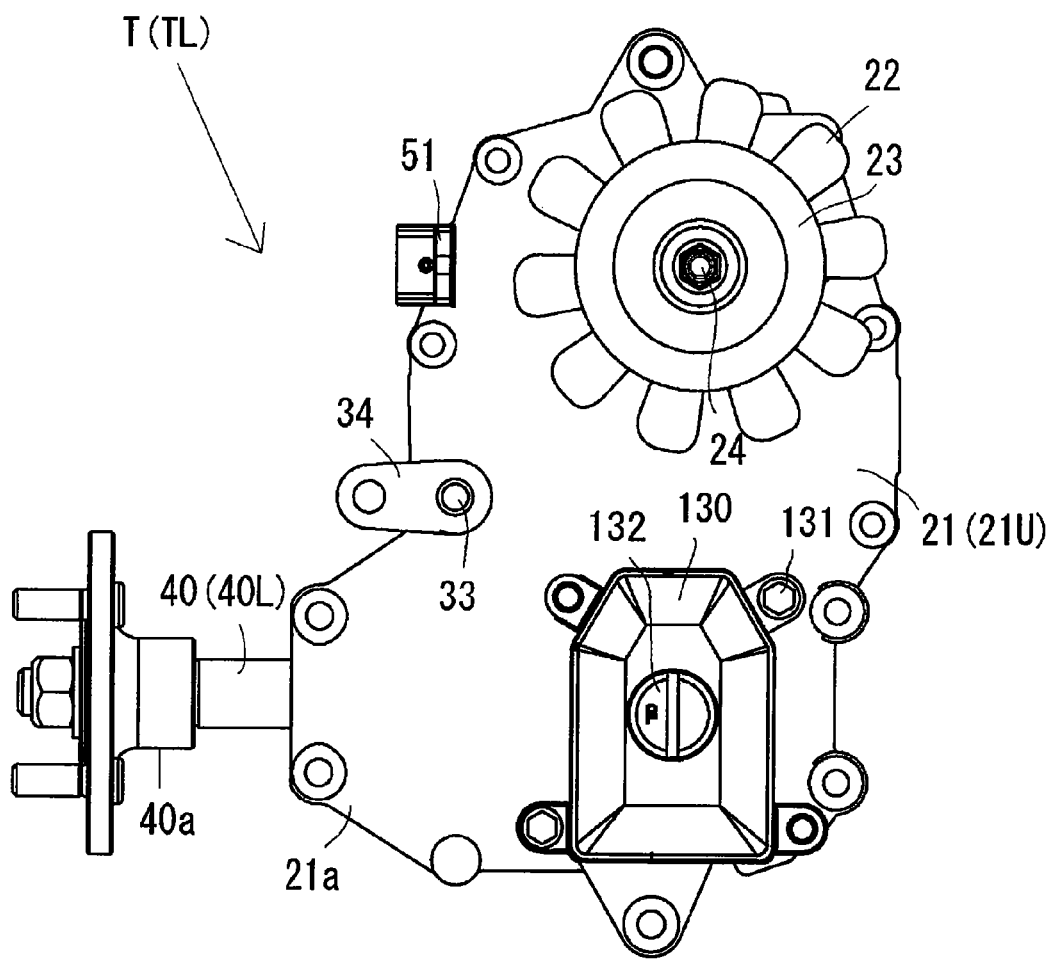
FIG. 18 is a plan view of transaxle T of FIG. 17.

Charge valve holes 14 and 15 are adapted to have respective charge check valves 44 and 45 fitted therein (see FIGS. 9, 11 and 12). An unshown charge fluid passage (corresponding to a charge fluid passage 14a in center section 1 of a transaxle T as shown in FIGS. 17 and 18) joined to connection passage 16 is formed in center section 1 and is opened at bottom surface 1d. When a charge pump 47 is attached onto bottom surface 1d as discussed later, charge pump 47 delivers fluid to the upstream sides of charge check valves 44 and 45. When either first or second fluid passage 8 or 9 is hydraulically depressed, corresponding charge check valve 44 or 45 is opened to pass the delivered fluid therethrough to supplement depressed fluid passage 8 or 9 with the fluid.

Vertical penetrating relief valve hole 17 is adapted to have a relief valve 43 that is vertical columnar rotary valve fitted therein. In center section 1, a horizontal relief passage 6a is extended from third kidney port 6, a horizontal relief passage 7a is extended from fourth kidney port 7 under relief passage 6a, and relief passages 6a and 7a are joined to relief valve hole 17.

Figure 2:
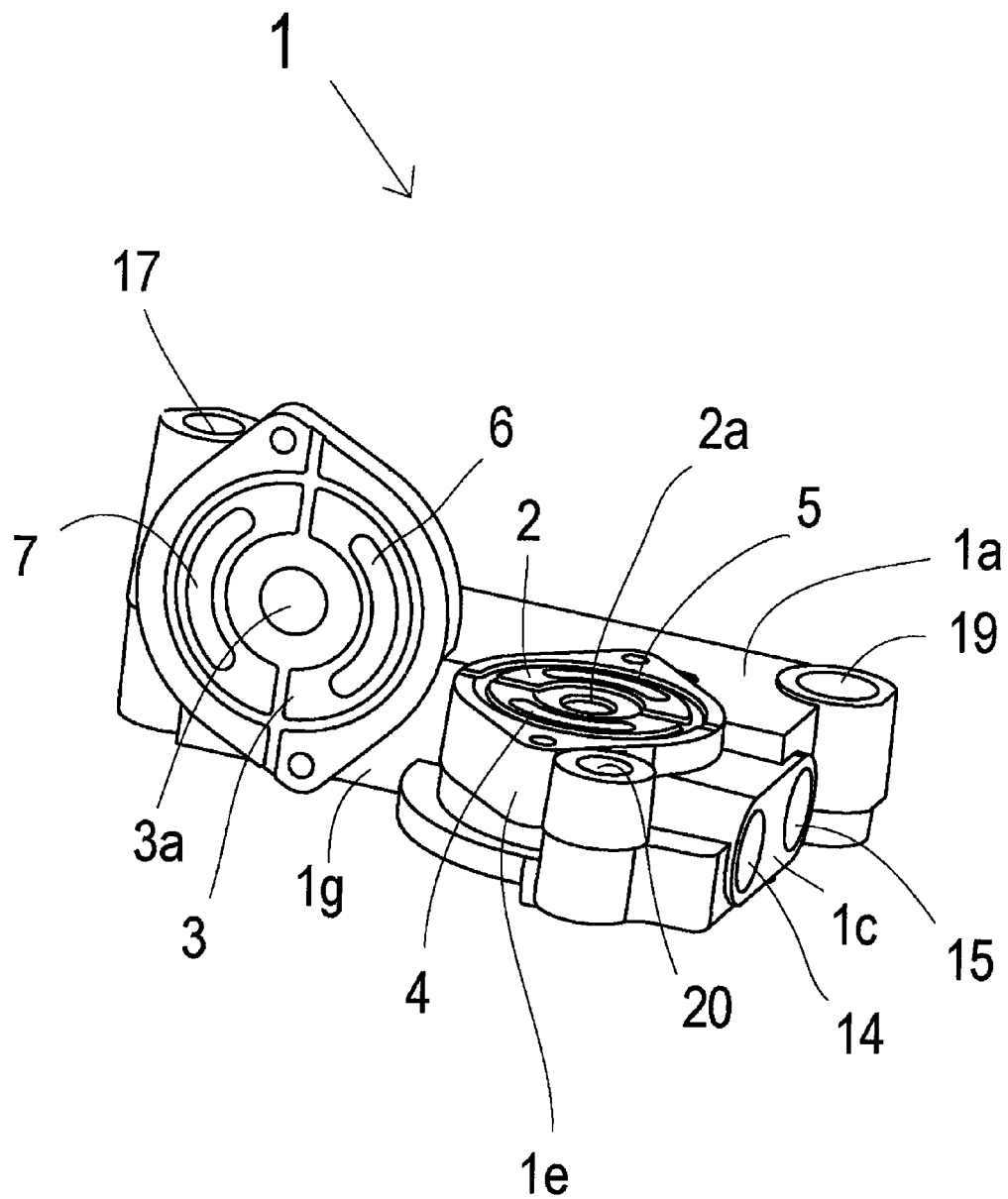
FIG. 2 is a perspective forwardly right view of center section 1.
Figure 7:
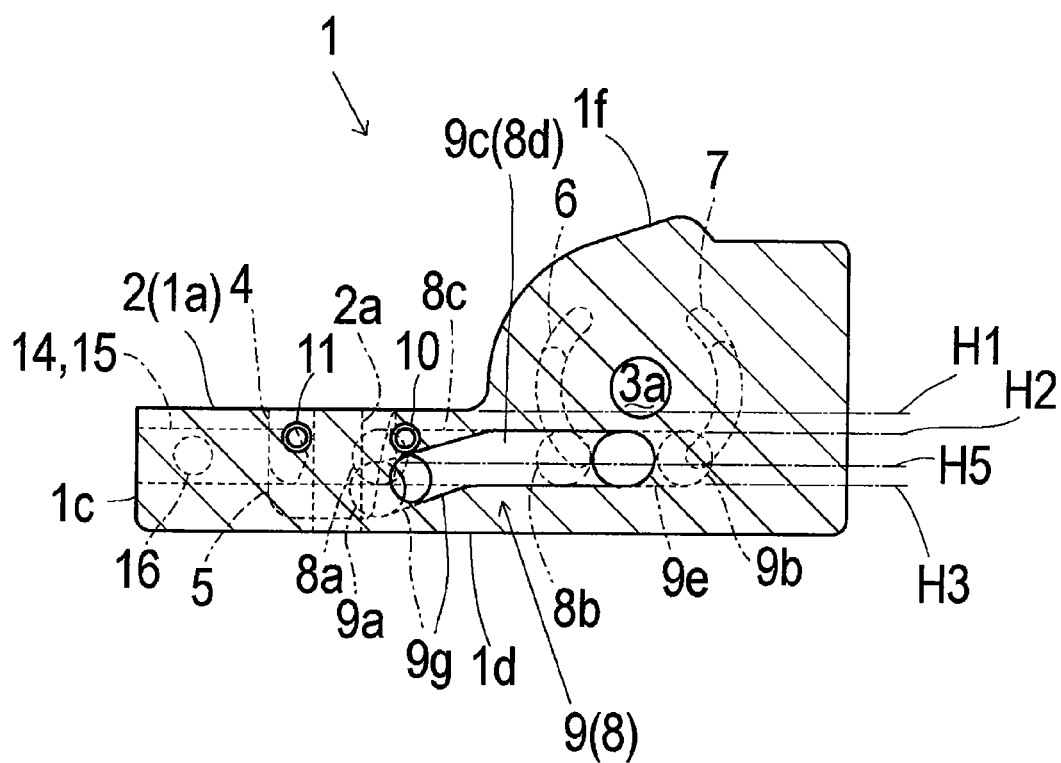
FIG. 7 is a sectional side view of center section 1 according to a second embodiment.

Center section 1 according to a second embodiment shown in FIG. 7 will be described. Center section 1 of this embodiment externally appears as shown in FIGS. 1 and 2. Center section 1 of the second embodiment has the following feature distinguished from that of the first embodiment shown in FIGS. 3 to 6. Second kidney port 5 is joined at a front end bottom to an alternative front end 9a of second fluid passage 9. The fore-and-aft position of front end 9a is the same as the fore-and-aft position of front end 8a of first fluid passage 8. The ceiling of front end 9a is disposed at a height H5 that is lower than height H2 of the ceiling of first fluid passage 8. An alternative first connection portion 9g connecting third straight portion 9c to front end 9a is extended rearwardly downward slantwise from the front end of third straight portion 9c so as to avoid neutral valve hole 10, so that front end 9a serves as the deepest portion of second fluid passage 9.

Figure 8:
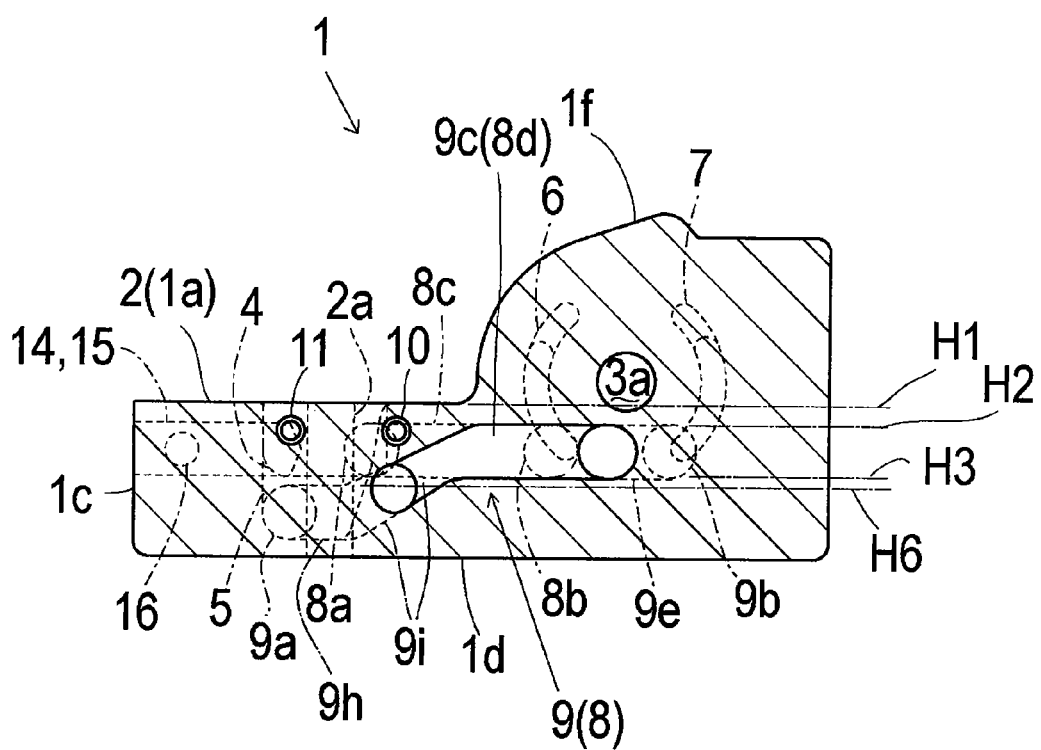
FIG. 8 is a sectional side view of center section 1 according to a third embodiment.

Center section 1 according to a third embodiment shown in FIG. 8 will be described. Center section 1 of this embodiment externally appears as shown in FIGS. 1 and 2. Center section 1 of the third embodiment has the following feature distinguished from that of the first embodiment shown in FIGS. 3 to 6. An alternative second kidney port 5 has a bottom deeper than that of second kidney port 5 of center section 1 according to the first embodiment, and is joined at a rear end bottom thereof to an alternative front end 9a of second fluid passage 9. The ceiling of front end 9a is disposed at a height H6 that is lower than height H3 of the bottom of first fluid passage 8. A horizontal portion 9h, serving as the deepest portion of second fluid passage 9, is extended rearward from front end 9a, and a slant portion 9i is formed between the rear end of horizontal portion 9h and the front end of third straight portion 9c and is extended forwardly downward slantwise so as to avoid neutral valve hole 10.

In each of the first to third embodiments, center section 1 is normally made by aluminum die-casting, and first to fourth kidney ports 4, 5, 6 and 7 and first and second fluid passages 8 and 9 are formed by lost-foaming so as to easily shape their curves. Neutral valve holes 10 and 11, charge valve holes 14 and 15, relief valve hole 17 and bolt holes 18, 19 and 20 are made by drilling. However, they may be made by alternative manners. Further, an alternative center section 1 may be shaped in external appearance laterally or vertically symmetrically to center section 1 shown in FIGS. 1 and 2. For example, in later-discussed transaxle T1 shown in FIGS. 24 to 28, an alternative center section 1 having a shape laterally symmetric to center section 1 shown in FIGS. 1 to 6 is arranged in a later-discussed way.

A working vehicle power transmission system shown in FIG. 9 serving as an example of adaptation of an HST including center section 1 will be described. An engine 61 has a vertical engine output shaft 61a fixedly provided on a bottom portion thereof with an output pulley 61b. A working device driving clutch unit includes a clutch casing 71 incorporating a hydraulic clutch 67 for a working device. A clutch input shaft 63 of clutch 67 projects upward from clutch casing 71 so as to be fixedly provided on a top portion thereof with a clutch input pulley 64. A belt 62 is interposed between engine output pulley 61b and clutch input pulley 64, so as to transmit power from engine 61 to clutch input shaft 63.

Figure 23:
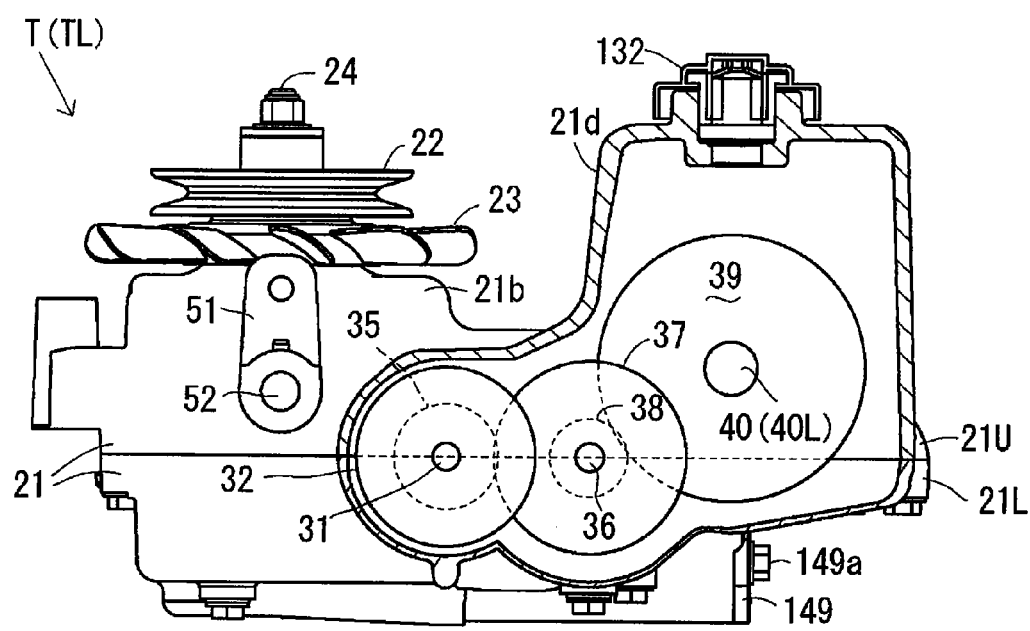
FIG. 23 is a side view partly in section of transaxle whose transaxle housing is formed integrally with a reservoir tank.

Clutch casing 71 incorporates a solenoid-controlled hydraulic switching valve 70 for controlling engagement/disengagement of clutch 67. Clutch 67 is disposed at the bottom of clutch input shaft 63, and a clutch output shaft 68 of clutch 67 is extended vertically downward coaxially to clutch input shaft 63. An output pulley 69 is fixed on clutch output shaft 68, so that a belt can be interposed between clutch output pulley 69 and an input pulley of a working device, e.g., a mower, thereby transmitting power from engine 61 to the working device through engaged clutch 67. Incidentally, in FIG. 9, clutch output shaft 68 and pulley 69 are illustrated so as to be entirely disposed in clutch casing 71 for the sake of convenience. Actually, the bottom end portion of clutch output shaft 68 fixedly provided thereon with pulley 69 projects downwardly outward from clutch casing 71 as shown in FIG. 23 as discussed later. Further, switching valve 70 may be disposed outside of clutch casing 71.

Right and left transaxles TR and TL (transaxles T as a generic name) as shown in FIGS. 10 to 23, or right and left transaxles T1R and T1L (transaxles T1 as a generic name) as shown in FIGS. 24 to 28, are disposed rightward and leftward from the working device driving clutch unit including clutch casing 71. Each transaxle T (or T1) includes a transaxle housing 21 (or 76) supporting an axle 40, i.e., each of right and left axles 40R and 40L, and incorporating an HST for driving axle 40. The HST includes a hydraulic pump P, a hydraulic motor M and center section 1 (not shown in FIG. 9) on which hydraulic pump P and motor M are mounted so as to be fluidly connected to each other through the pair of fluid passages 8 and 9 in center section 1. Further, transaxle housing 21 (or 76) incorporates a deceleration gear train R interposed between a motor shaft 31 of hydraulic motor M, serving as an output shaft of the HST, and axle 40. Right transaxle TR (or T1R) drives right axle 40R by its HST so as to drive a right wheel 60R fixed on an outer end of right axle 40R, and left transaxle TL (or T1L) drives left axle 40L by its HST so as to drive a left wheel 60L fixed on an outer end of left axle 40L.

A pump shaft 24 of hydraulic pump P projects outward from transaxle housing 21 (or 76) of each transaxle T (or T1) so as to be fixedly provided thereon with an input pulley 23 (or 77). A distributing pulley 65 is fixed on clutch input shaft 63 outside of clutch casing 71, and a belt 66 is looped over distributing pulley 65 and input pulleys 23 (or 77) of right and left transaxles TR and TL (or T1R and T1L) so as to distribute the rotary force of input shaft 63 receiving power of engine 61 between hydraulic pumps P of right and left transaxles TR and TL (or T1R and T1L).

Each pump shaft 24 also serves as a drive shaft of charge pump 47 disposed in each transaxle housing 21 (or 76). Fluid filled in transaxle housing 21 (or 76) serves as a fluid sump 89. Charge pump 47 absorbs fluid from fluid sump 89 through fluid filter 48 (or 74) and supplements the fluid to depressed fluid passage 8 or 9 through opened corresponding charge check valve 44 or 45. When a relief valve operation device (e.g., lever) 42 is operated for opening relief valve 41, fluid is drained from both fluid passages 8 and 9 to fluid sump 89 in transaxle housing 21 (or 76) so as to release wheels 60R and 60L from the dynamic brake caused by the hydraulic pressure of the HST during towing of a vehicle, for example. A pressure regulating valve 75 regulates the pressure of fluid supplied to charge check valves 44 and 45.

The delivery fluid from charge pump 47 of either right or left transaxle TR or TL (T1R or T1L) is extracted from transaxle housing 21 (76) and is supplied to hydraulic clutch 67 through switching valve 70. In the illustrated embodiment, the delivery fluid from charge pump 47 in left transaxle TL (or T1L) is extracted and supplied to hydraulic clutch 67.

An external reservoir tank 72 is fluidly connected to fluid sumps 89 in transaxle housings 21 (or 76) of right and left transaxles TR and TL (or T1R and T1L) and to a fluid sump 90 in clutch casing 71. Reservoir tank 72 absorbs fluid expanded by heat generated from the activating HST or for another reason, and supplies fluid to compensate for a short of fluid of fluid sump 89 or 90.

Left transaxle TL for driving left axle 40L representing right and left transaxles TR and TL will be described with reference to FIGS. 10 to 16. Hereinafter, left transaxle TL is simply referred to as "transaxle T", and left axle 40L is simply referred to as "axle 40".

An upper housing half 21U and a lower housing half 21L are joined to each other through a horizontal joint surface and are fastened together by bolts 46, so as to constitute transaxle housing 21. A rear portion of upper housing half 21U is expanded laterally outward (leftward when transaxle T is left transaxle TL, or rightward when transaxle T is right transaxle TR) so as to be formed as an axle support portion 21a for supporting axle 40. A front interior portion of transaxle housing 21 serves as an HST chamber incorporating the HST, and is filled with fluid so as to provide fluid sump 89 therein.

The HST of transaxle T will be described. In the front portion of transaxle housing 21, center section 1 is shaped and arranged so that horizontal surface 1a and pump mounting surface 2 serve as the upper surface thereof, horizontal surface 1d serves as the bottom surface thereof, vertical surface 1b serves as the left surface thereof, vertical surface 1c serves as the front surface thereof, vertical surface 1g serves as the right surface thereof, expanded portion 1e is expanded rightward, and expanded portion 1f is expanded upward. Bolts 43 are screwed through respective bolt holes 18, 19 and 20 so as to fasten center section 1 to either or both of upper and lower housing halves 21U and 21L.

Vertical pump shaft 24 is rotatably passed through pump shaft hole 2a and is extended downward from bottom surface 1d of center section 1 so as to serve as the drive shaft of charge pump 47. Charge pump 47 is a trochoidal gear pump as an assembly of inner and outer rotors, abutting at upper surfaces thereof against bottom surface 1d of center section 1, and caught at bottom surfaces thereof in a charge pump housing 49.

A spring 50 is interposed between a bottom of transaxle housing 21 (i.e., lower housing half 21L) and a bottom of charge pump housing 49 so as to regulate the pressure of charge pump 47 against center section 1, i.e., the charging pressure of fluid. A vertically axial and circular cylindrical fluid filter 48 is interposed between bottom surface 1d of center section 1 and transaxle housing 21 (i.e., lower housing half 21L) so as to enclose charge pump 47, charge pump housing 49 and spring 50. Therefore, charge pump 47 is driven by pump shaft 24 so as to absorb fluid from fluid sump 89 in transaxle housing 21 through fluid filter 48.

As shown in FIG. 12, lower housing half 21L is formed at a rear end portion thereof with a vertical wall 21e which is circular when viewed in front. Vertical wall 21e is adapted to be easily bored to form a hole 21f as shown in FIGS. 17 to 23 so that a horizontally extended fluid filter 148 can be assembled into transaxle housing 21 through hole 21f as described later with reference to FIGS. 17 to 23.

Relief valve 41 serving as the columnar rotary valve is relatively rotatably fitted into relief valve hole 17, and projects at a top portion thereof upward from transaxle housing 21 (i.e., upper housing half 21U) so as to be fixedly provided thereon with relief valve lever 42. The function of relief valve 41 by operating lever 42 is as mentioned above.

With regard to hydraulic pump P, a cylinder block 25 is slidably rotatably fitted onto horizontal pump mounting surface 2 through a valve plate, and is relatively unrotatably engaged at the axial center portion thereof on vertical pump shaft 24 passed through shaft hole 2a. Pistons 26 are vertically reciprocally fitted through respective springs into respective cylinder bores in cylinder block 25 around pump shaft 24. A cradle type movable swash plate 27 is rotatably fitted to a ceiling of transaxle housing 21 (i.e., upper housing half 21U) and abut against heads of pistons 26 projecting outward from cylinder block 25.

Figure 13:
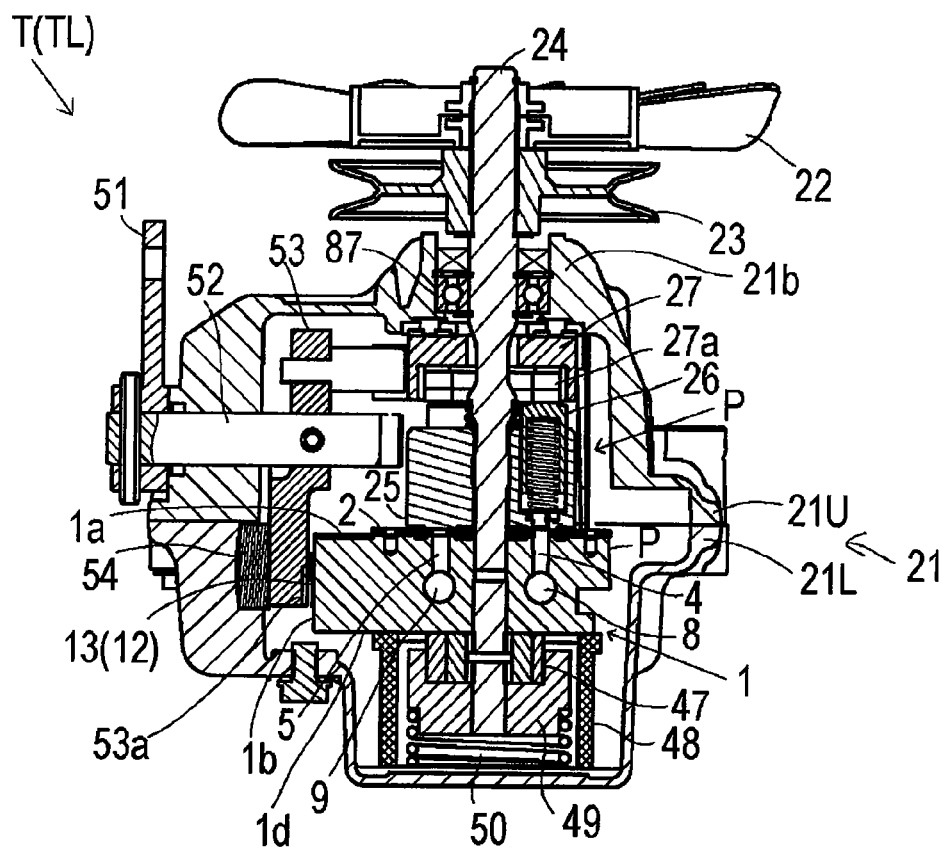
FIG. 13 is a cross sectional view of transaxle T taken along XIII-XIII line of FIG. 10.
Figure 14:
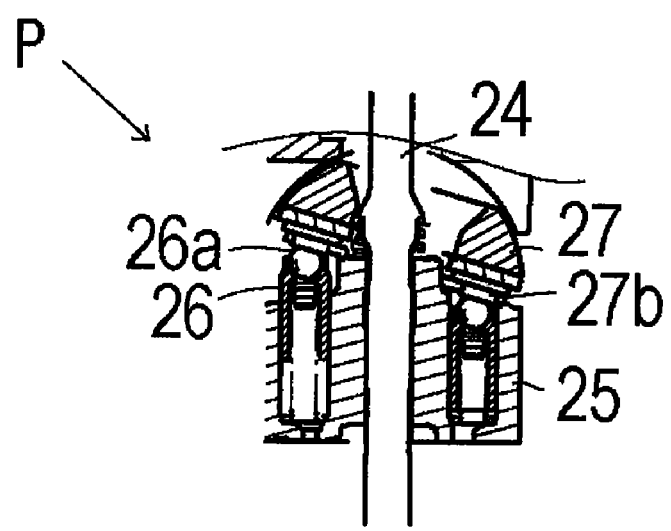
FIG. 14 is a sectional side view of a shoe type hydraulic pump P.

In this regard, FIG. 13 and others illustrate shoe-less type pistons 26. Alternatively, as shown in FIG. 14, shoe type pistons 26 provided on heads thereof with respective shoes 26a may be used. When shoe-less type pistons 26 are used, movable swash plate 27 is provided with a thrust bearing 27a directly abutting against the heads of all pistons 26. When shoe type pistons 26 are used, movable swash plate 27 is provided with a shoe retainer 27b replacing thrust bearing 27a, and shoe retainer 27b is engaged to shoes 26a on the heads of all pistons 26. Later-discussed illustrated shoe-less type pistons 29 of hydraulic motor M may be replaced with shoe type pistons. The same thing is adapted to pistons 26 and 29 of hydraulic pump P and motor M in each of later-discussed transaxles T1 and T2.

Figure 10:
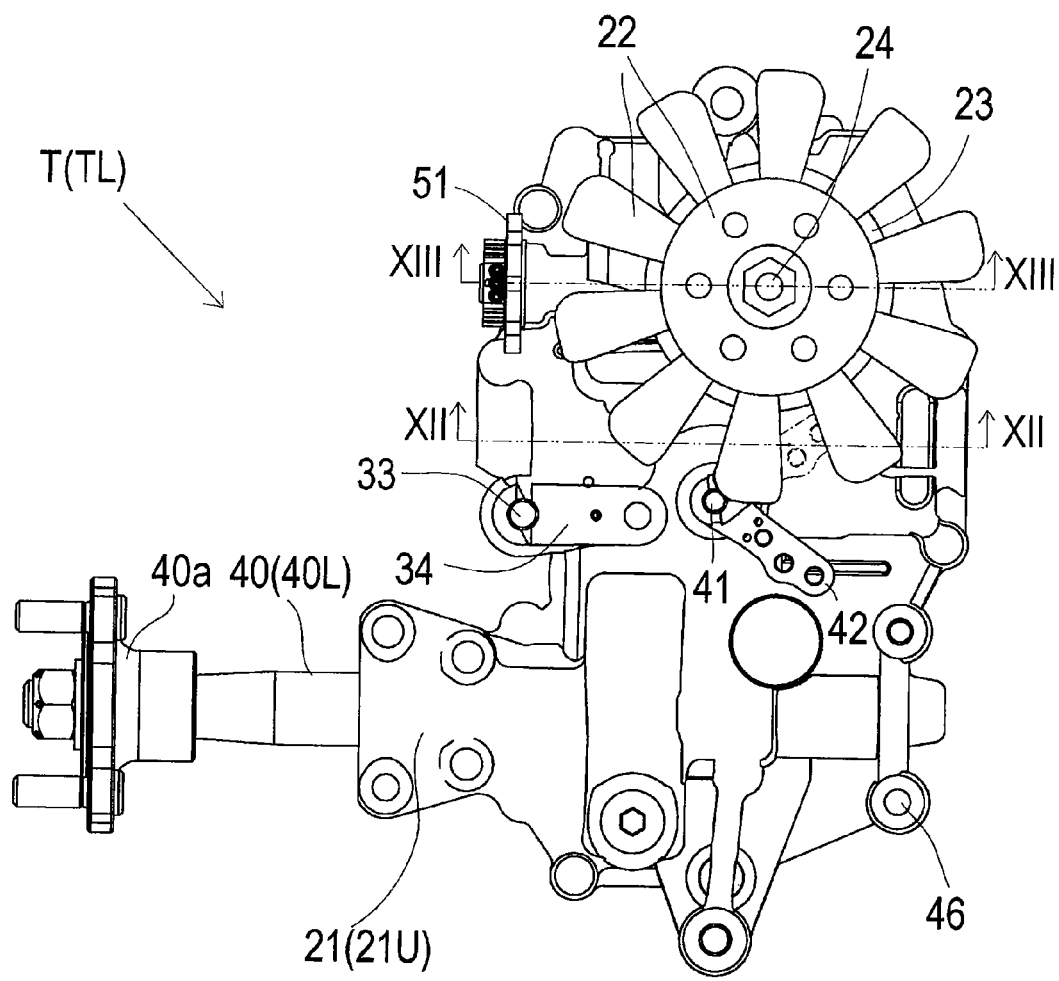
FIG. 10 is a plan view of transaxle T incorporating an HST including center section 1.

Pump shaft 24 is journalled by a top portion 21b of transaxle housing 21 (i.e., upper housing half 21U) through a bearing 87 and projects at a top portion thereof upwardly outward from top portion 21b. As shown in FIGS. 10, 12 and 13, the upwardly projecting top portion of pump shaft 24 is fixedly provided thereon with a cooling fan 22 and an input pulley 23 between cooling fan 22 and top portion 21b of transaxle housing 21 (i.e., upper housing half 21U).

Figure 15:
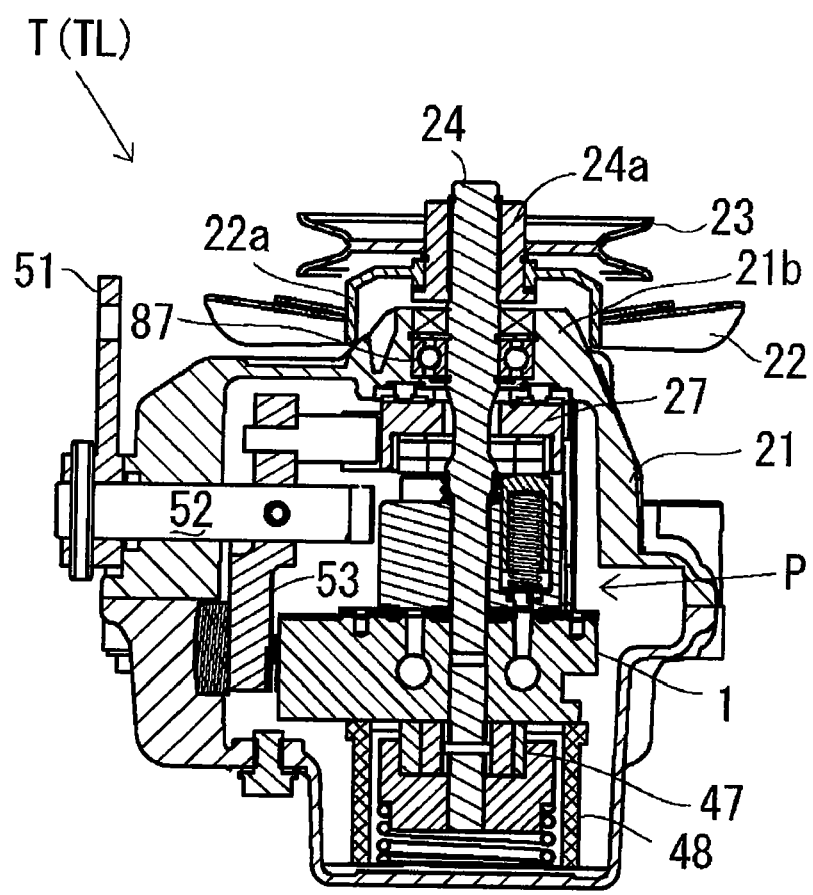
FIG. 15 is a sectional rear view of transaxle T having a rearranged cooling fan.

Alternatively, cooling fan 22 and input pulley 23 may be arranged as shown in FIG. 15. In this regard, a sleeve 24a is relatively unrotatably fitted (e.g., spline-fitted) onto the top portion of pump shaft 24 projecting upward from transaxle housing 21, and input pulley 23 is fixed on sleeve 24a. A central body portion 22a of cooling fan 22 is formed into a downwardly opened cylindrical shape, and has a center hole at the top end thereof. Sleeve 24a fitted on pump shaft 24 is fittingly passed through the top center hole of central body portion 22a of cooling fan 22, so that central body portion 22a of cooling fan 22 is arranged to surround top portion 21b of transaxle housing 21. Therefore, banes projecting radially from central body portion 22a of cooling fan 22 are disposed horizontally sideward from top portion 21b of transaxle housing 21.

In this way, cooling fan 22 is compactly disposed in a dead space around top portion 21b of transaxle housing 21, and input pulley 23 fixed on the top end of pump shaft 24 above cooling fan 22 is disposed adjacent to the top end of top portion 21b of transaxle housing 21, thereby vertically minimizing the top portion of transaxle T above transaxle housing 21. Therefore, entire transaxle T can be vertically minimized so as to increase the ground clearance under the bottom of transaxle housing 21. Further, pump shaft 24 is shortened to enhance its rigidity.

Figure 16:
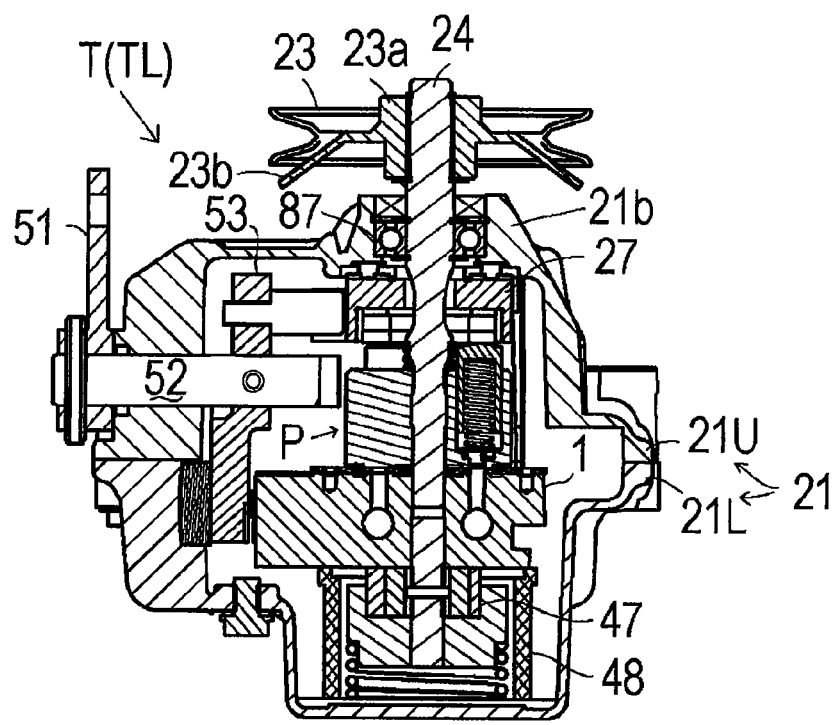
FIG. 16 is a sectional rear view of transaxle T having a cooling fan integrated with an input pulley.

Alternatively, as shown in FIG. 16, a cooling fan 23b may be formed as a part of input pulley 23. In this embodiment, a central boss 23a of input pulley 23 is relatively unrotatably fitted (e.g., spline-fitted) on top portion 21b of transaxle housing 21, and banes serving as cooling fan 23b project downwardly slantwise from central boss 23a so as to be surrounded by the outer peripheral portion of input pulley 23.

Therefore, cooling fan 23b and input pulley 23 are arranged at the substantially same height. Accordingly, similar to the embodiment of FIG. 15, the top portion of transaxle T above transaxle housing 21 is vertically minimized so as to bring the above-mentioned effect. Further, since input pulley 23 is partly formed integrally with cooling fan 23b, components are reduced in number and cost.

With regard to hydraulic motor M, a cylinder block 28 is slidably rotatably fitted onto vertical motor mounting surface 3 through a valve plate, and is relatively unrotatably engaged at the axial center portion thereof onto laterally horizontal motor shaft 31 passed through shaft hole 3a. Pistons 29 are horizontally reciprocally fitted through respective springs into cylinder bores in cylinder block 28 around motor shaft 31.

A fixed swash plate 30 is fixed to a (right) side wall portion of transaxle housing 21 (i.e., upper and lower housing halves 21U and 21L), and is provided with a thrust bearing 30a abutting against heads of pistons 29 projecting outward from cylinder block 28. When pistons 29 are shoe type pistons as discussed above, a shoe retainer replacing thrust bearing 30a is fitted on fixed swash plate 30.

Motor shaft 31 is extended laterally horizontally parallel to axle 40. Motor shaft 31 penetrates center section 1 through shaft hole 3a and projects leftward from center section 1. Deceleration gear train R is interposed between the leftward projecting portion of motor shaft 31. In this regard, a laterally horizontal counter shaft 36 is extended between motor shaft 31 and axle 40 parallel. A laterally (axially) long small diameter gear 38 is fitted on counter shaft 36, and a large diameter gear 37 is fixed on small diameter gear 38. A motor gear 35 is fixed on motor shaft 31, and meshes with large diameter gear 37. A bull gear 39 is fixed on axle 40, and meshes with a portion of small diameter gear 38 projecting axially (rightward) from large diameter gear 37. Axle 40 and counter shaft 36 are supported in transaxle housing 21 by using a later-discussed support structure for supporting those in transaxle housing 76 of transaxle T1.

A bake disc 32 is fixed on a left end of motor shaft 31, and a vertical brake camshaft 33 facing brake disc 32 is supported by transaxle housing 21 so as to be rotatable centered on the center axis thereof. Brake camshaft 33 projects at a top portion thereof upward from transaxle housing 21 (i.e., upper housing half 21U) so as to be fixedly provided thereon with a brake operation lever 34. When brake operation lever 34 is operated for braking, a cam of brake camshaft 33 is rotated to press and stop brake disc 32 through a brake shoe, thereby braking motor shaft 31.

The rotary speed and direction of axle 40 are determined according to the tilt angle and direction of movable swash plate 27 of hydraulic pump P. A laterally horizontal control shaft 52 serving as a fulcrum shaft of movable swash plate 27 is rotatably supported by transaxle housing 21 (i.e., upper housing half 21U). A speed control lever 51 is fixed on an outer end of control shaft 52 outside of transaxle housing 21 and is operatively connected to a speed control operation device provided on a vehicle.

In transaxle housing 21, a control arm 53 is fixed on an inner end of control shaft 52. Control arm 53 has end portions opposite to each other with respect to control shaft 52. One of the opposite end portions of control arm 53 is pivoted onto movable swash plate 27, so that movable swash plate 27 is rotated centered on control shaft 52 according to rotation of control shaft 52.

The other of the opposite end portions of control arm 53 is expanded to serve as relief groove plate 53. Relief groove plate 53 is disposed along left surface 1*b* of center section 1 and is pressed against the outer ends of neutral valves 12 and 13. A friction member 54 is supported by transaxle housing 21, and relief groove plate 53 is frictionally pressed against friction member 54 at a vertical side surface thereof opposite to center section 1. Relief groove (or grooves) 53*a* is (or are) formed on the surface of relief groove plate 53 facing center section 1 so as to be opened to fluid sump 89 in transaxle housing 21. When movable swash plate 27 comes into the vicinity of its neutral position, relief groove 53*a* is opened to neutral valve 12 or 13 so as to drain fluid from either higher-pressurized fluid passage 8 or 9 in center section 1 to fluid sump 89, thereby surely realizing the neutral state of the HST.

In an alternative transaxle T shown in FIGS. 17 to 20, upper housing half 21U is provided at an upper portion thereof with an upward opening behind top portion 21*b* supporting pump shaft 24. A horizontal flat edge surrounding this opening serves as a mount base 21*c* onto which a downwardly opened reservoir tank 130 separated from transaxle housing 21 is mounted and fastened by bolts 131. Accordingly, the interior space of reservoir tank 130 is opened to the inside space of transaxle housing 21 so that excessive fluid of fluid sump 89 can be absorbed into the inside space of reservoir tank 130. Reservoir tank 130 is formed at a top portion thereof with an oiling port, which is covered with an oil cap 132 also serving as a breather.

In an alternative transaxle T shown in FIG. 23, upper housing half 21U is formed integrally with a reservoir tank portion 21*d* which projects upward and is opened at an inside space thereof to fluid sump 89. Reservoir tank portion 21*d* is formed at a top portion thereof with an oiling port, which is covered with an oil cap 132 also serving as a breather.

Figure 19:
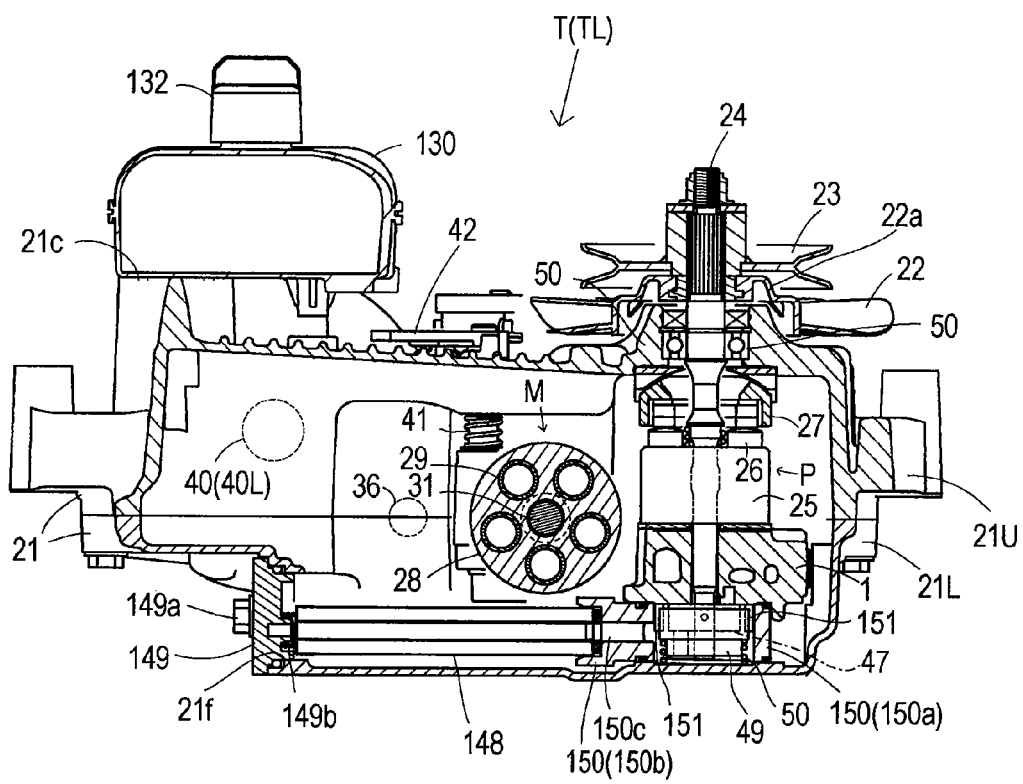
FIG. 19 is a side view partly in section of transaxle T of FIG. 17 supporting a horizontally extended and sectionally oval fluid filter by the transaxle housing and a separate support member.
Figure 20:
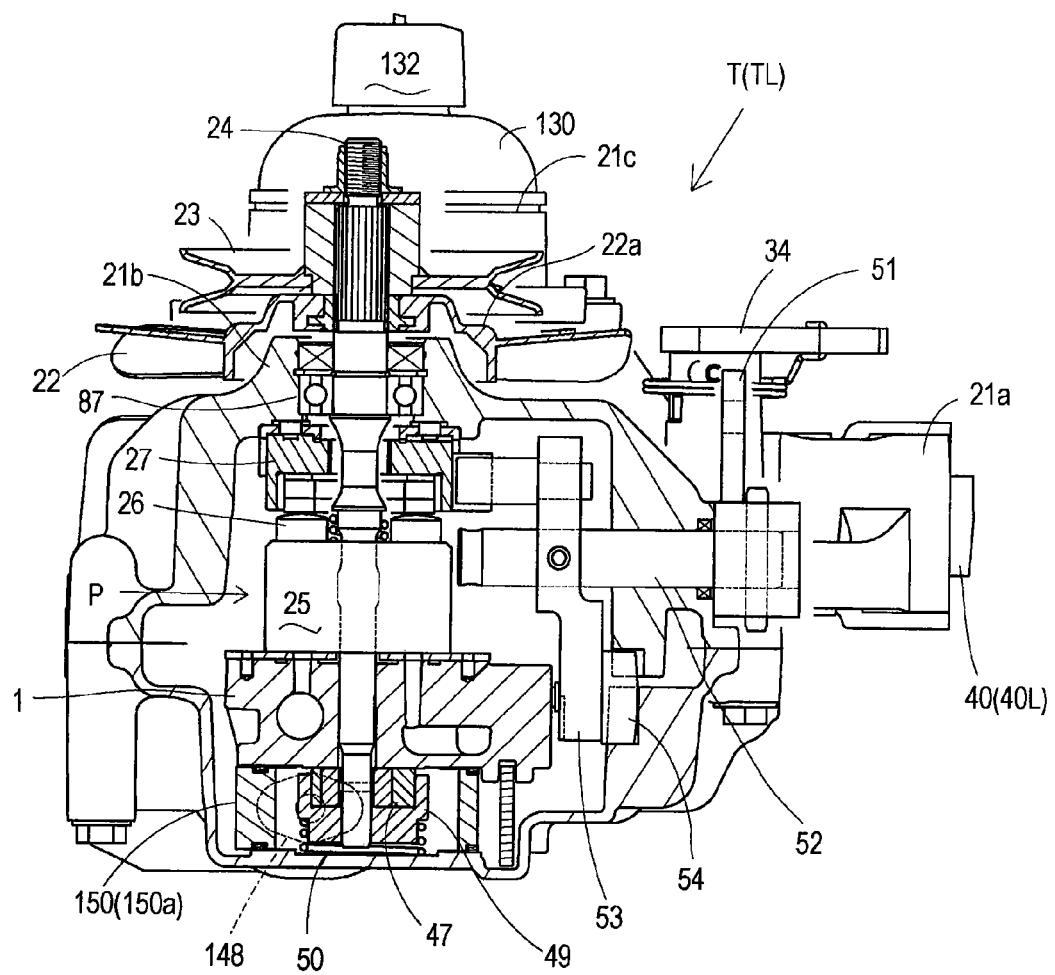
FIG. 20 is a sectional front view of transaxle T of FIG. 19.
Figure 21:
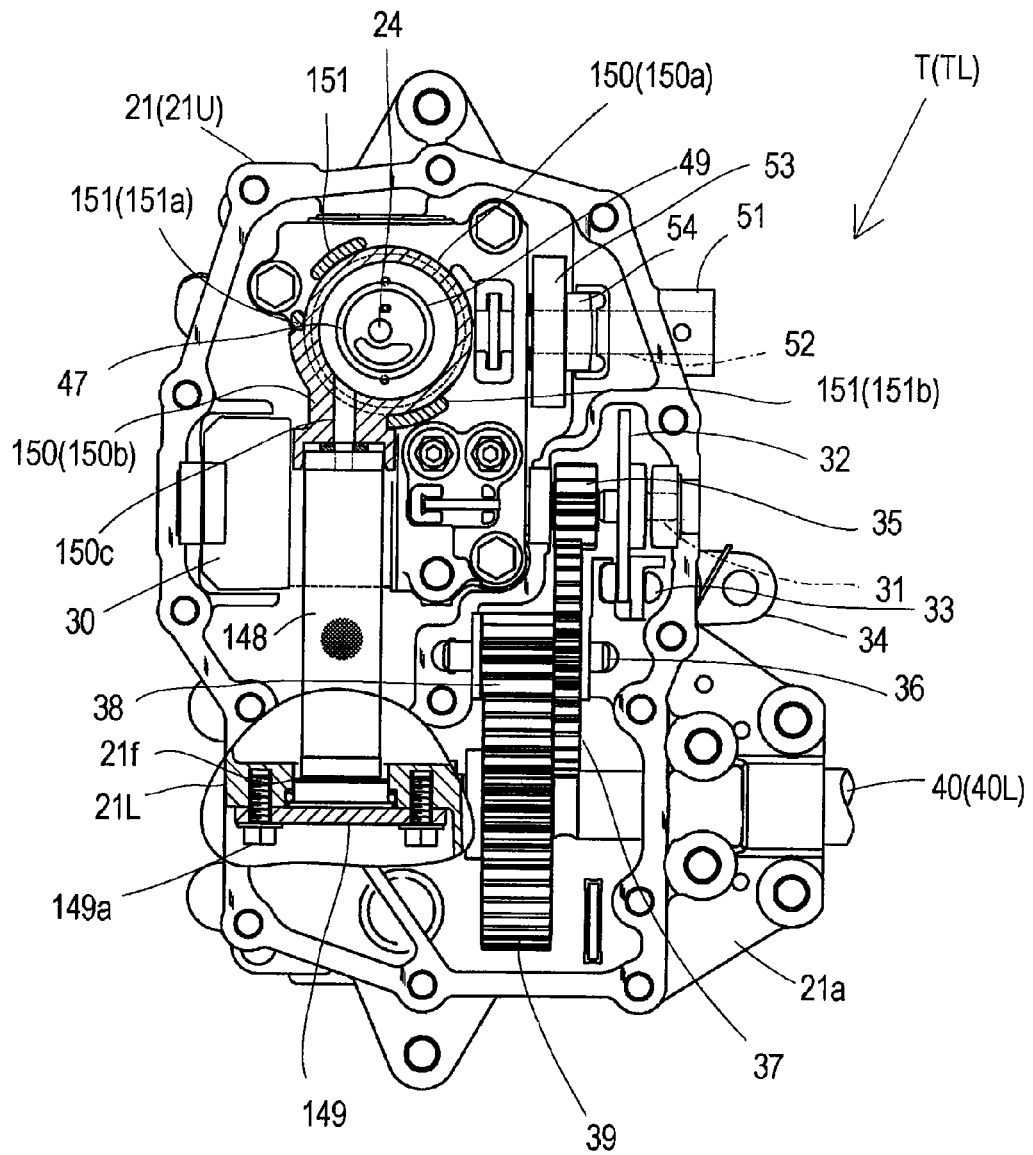
FIG. 21 is a bottom view partly in section of transaxle T of FIG. 19 from which a lower housing half 21L has been removed.

Transaxle T shown in FIGS. 19 to 21 is provided with horizontally extended oval cylindrical fluid filter 148. As mentioned above, wall 21*e* of lower housing half 21L is bored by hole 21*f*, and fluid filter 148 is passed through hole 21*f* so as to be installed into transaxle housing 21, or to be removed from transaxle housing 21. After the installation of fluid filter 148 into transaxle housing 21, hole 21*f* is plugged by a cap 149 which is fastened to lower housing half 21L by a bolt 149*a*. Fluid filter 148 is pressed at an outer end thereof against cap 149 through a compressed spring 149*b*.

In this transaxle T provided with fluid filter 148, a support member 150 is interposed between bottom surface 1*d* of center section 1 and the bottom portion of lower housing half 21. Support member 150 is formed integrally with a vertically axial and circular cylindrical charge pump housing portion 150*a* and a filter support portion 150*b*. Charge pump housing portion 150*a* replaces fluid filter 48 so as to surround charge pump 47, charge pump housing 49 supporting charge pump 47, and spring 50. Filter support portion 150*b* supports an inner end of fluid filter 148. Further, support member 150 is formed with a penetrating hole 150*c* extended through filter charge pump housing portion 150*a* and support portion 150*b* so as to fluidly connect the inside space of fluid filter 148 to the inside space of charge pump housing portion 150*a*. Therefore, fluid of fluid sump 89 is introduced into the inside space of support member 150 through fluid filter 148 and is absorbed into charge pump 47.

Center section 1 is formed integrally with retaining portions 151 extended downward from bottom surface 1*d*. Retaining portions 151 are disposed along the outer peripheral surface of charge pump housing portion 150*a* so as to locate the vertical center line of charge pump housing portion 150*a* coaxially to pump shaft 24. Retaining portions 151 include stoppers 151*a* and 151*b*. Support member 150 is formed with steps at junctions between filter support portion 150*b* and the outer peripheral surface of charge pump housing portion 150*a*. Stoppers 151*a* and 151*b* are fitted to these steps of support member 150 so as to fix the position of charge pump housing portion 150*a* in the peripheral direction around the central axis thereof (i.e., the axis of motor shaft 24), and to fix the position of filter support portion 150*b* relative to fluid filter 148.

Figure 22:
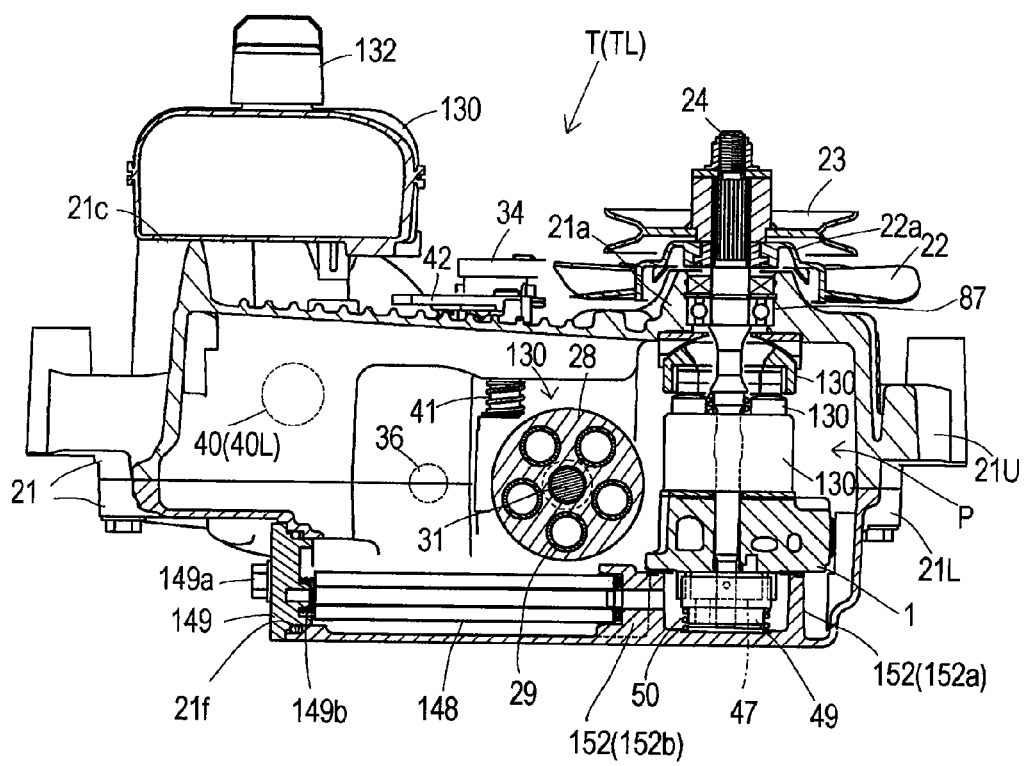
FIG. 22 is a side view partly in section of transaxle T of FIG. 17 supporting the horizontally extended and sectionally oval fluid filter by a support portion integrally formed on the transaxle housing.

In an alternative transaxle T shown in FIG. 22, lower housing half 21L is formed integrally with a support portion 152 replacing support member 150. Support portion 152 is shaped so as to have a charge pump housing portion 152*a* and a filter support portion 152*b*, which replace corresponding portions 150*a* and 150*b* of support member 150. Vertically axial and circular cylindrical charge pump housing portion 152*a* is extended upward from the bottom portion of lower housing half 21L, abuts at a top thereof against bottom surface 1*d* of center section 1, and surrounds charge pump 47, charge pump housing 49 and spring 50. Filter support portion 152*b* supports the inner end of fluid filter 148.

Left transaxle T1L for driving left axle 40L representing right and left transaxles T1R and T1L will be described with reference to FIGS. 24 to 28. Hereinafter, left transaxle T1L is simply referred to as "transaxle T1", and left axle 40L is simply referred to as "axle 40".

An upper housing half 76U and a lower housing half 76L are joined to each other through a horizontal joint surface and are fastened together by bolts 46, so as to constitute transaxle housing 76. A rear portion of upper housing half 76U is expanded laterally outward (leftward when transaxle T1 is left transaxle T1L, or rightward when transaxle T1 is right transaxle T1R) so as to be formed as an axle support portion 76a for supporting axle 40. A front interior portion of transaxle housing 76 serves as an HST chamber incorporating the HST, and is filled with fluid so as to provide fluid sump 89 therein.

The HST of transaxle T1 will be described. In the front portion of transaxle housing 76, center section 1 is shaped and arranged so that horizontal surface 1a and pump mounting surface 2 serve as the bottom surface thereof, horizontal surface 1d serves as the upper surface thereof, vertical surface 1b serves as the left surface thereof, vertical surface 1c serves as the front surface thereof, vertical surface 1g serves as the right surface thereof, expanded portion 1e is expanded rightward, and expanded portion 1f is expanded upward. As mentioned above, center section 1 of transaxle T1 is shaped laterally symmetric with center section 1 shown in FIGS. 1 and 2 for transaxle T, and is vertically inversed to be adapted for transaxle T1. Bolts 43 are screwed through respective bolt holes 18, 19 and 20 so as to fasten center section 1 to either or both of upper and lower housing halves 76U and 76L.

Vertical pump shaft 24 is rotatably passed through pump shaft hole 2a and is extended downward from bottom surface 1d of center section 1 so as to be used as the drive shaft of the trochoidal gear pump serving as charge pump 47.

A charge pump housing 73 incorporating charge pump 47 is fixed onto upper surface 1d of center section 1. A left portion of charge pump housing 73 is extended leftward from left surface 1b of center section 1 so as to serve as a filter support portion 73g. A vertically axial and circular cylindrical fluid filter 74 is interposed between a bottom end of filter support portion 73g and a bottom portion of transaxle housing 76 (i.e., lower housing half 76L).

Charge pump housing 73 is formed therein with a suction port 73c and a delivery port 73d to be opened to charge pump 47. Further, charge pump housing 73 is formed therein with a vertical fluid duct 73a and a laterally horizontal fluid duct 73b. Fluid duct 73a is opened at the bottom end thereof in the bottom end of filter support portion 73g, and is connected at the top end thereof to fluid duct 73b. A left end of fluid duct 73b opened outward from charge pump housing 73 is plugged. Fluid duct 73b is joined at a right end thereof to suction port 73c. Therefore, charge pump 47 absorbs fluid from fluid sump 89 through fluid filter 74, fluid duct 73a and 73b and suction port 73c.

Charge pump housing 73 is formed therein with a horizontal fluid duct 73e extended from delivery port 73d. A pressure regulating valve 75 is installed into charge pump housing 73 and is connected to an intermediate portion of fluid duct 73e, so as to regulate the pressure of fluid delivered from charge pump 47. An outer end of fluid duct 73e opened outward from charge pump housing 73 is plugged. Further, charge pump housing 73 is formed with a vertical fluid duct 73f. Fluid duct 73f is joined at a top end thereof to fluid duct 73e adjacent to the plugged outer end of fluid duct 73e. Fluid duct 73f is opened at a bottom end thereof in the bottom surface of charge pump housing 73. Charge fluid passage 14a is formed in center section 1, and is opened upward at upper surface 1d of center section 1 so as to be joined to the opened bottom end of fluid duct 73f. Charge fluid passage 14a is extended vertically upward from charge valve hole 14. Alternatively, a charge fluid passage formed in center section 1 to be joined to the delivery fluid duct in charge pump housing 73 may be extended from charge valve hole 15 or connection passage 16. Any charge fluid passage may be configured only if it can supply fluid to the upstream sides of both charge check valves 44 and 45 fitted in respective charge valve holes 14 and 15. In this way, the fluid delivered from charge pump 47 can be supplied to either fluid passage 8 or 9 through opened charge check valve 44 or 45.

In FIGS. 24 to 28, the structure for supplying fluid to valve 70 and clutch 67 outside of transaxle T as shown in FIG. 9 is omitted, however, it is provided outside of transaxle T1.

Transaxle T1 shown in FIGS. 24 to 28 does not include relief valve 41. Instead of relief valve 41, a column (or bolt) 91 is fitted into relief valve hole 17 so as to block relief valve hole 17.

With regard to hydraulic pump P, cylinder block 25 is slidably rotatably fitted through a valve plate onto pump mounting surface 2 formed on the bottom surface of center section 1. Pistons 26 are vertically reciprocally fitted into cylinder block 25, and project at the heads thereof downward from cylinder block 25 so as to abut against movable swash plate 27 fitted on a bottom portion of transaxle housing 76 (i.e., lower housing half 76L).

Lower housing half 76L of transaxle housing 76 is formed with a pump shaft support portion 76g projecting downward from a bottom portion thereof so as to journal pump shaft 24 through a bearing 79. Pump shaft 24 projects downward from pump shaft support portion 76g so as to be provided thereon with an input pulley 77. In this regard, input pulley 77 is disposed to surround pump shaft support portion 76g. Input pulley 77 is formed integrally with an upwardly opened cup-shaped central portion 77a. Cup-shaped central portion 77a is formed on a bottom center thereof with a spline boss. The bottom portion of pump shaft 24 projecting downward from pump shaft support portion 76g is spline-fitted into the spline boss of input pulley 77. A bearing 78 is interposed between pump shaft support portion 76g and an upper edge of cup-shaped central portion 77a. Therefore, input pulley 77 is disposed adjacently under the bottom surface of transaxle housing 76 (i.e., lower housing half 76L), so that belt 66 looped over pulley 77 can be sufficiently high.

Figure 24:
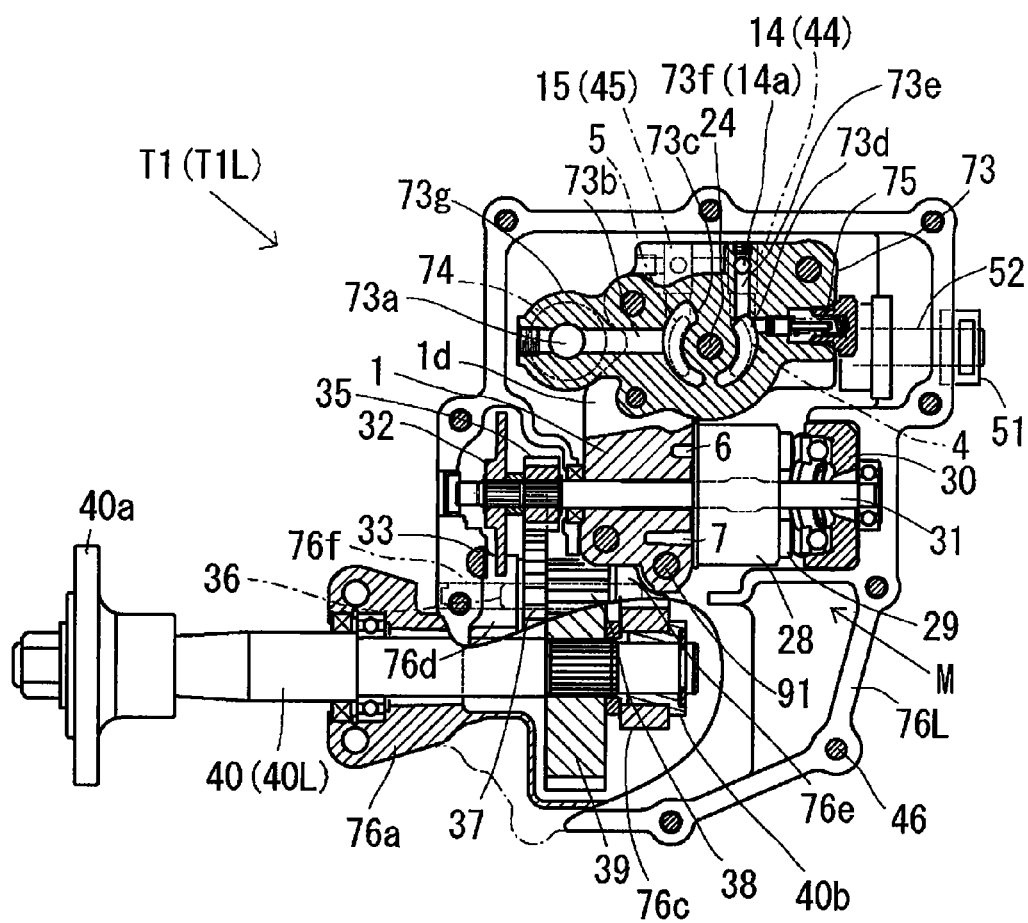
FIG. 24 is a plan view partly in section of transaxle T1 incorporating an HST provided with a charge pump above the center section, an upper housing half 76U having been removed therefrom.
Figure 25:
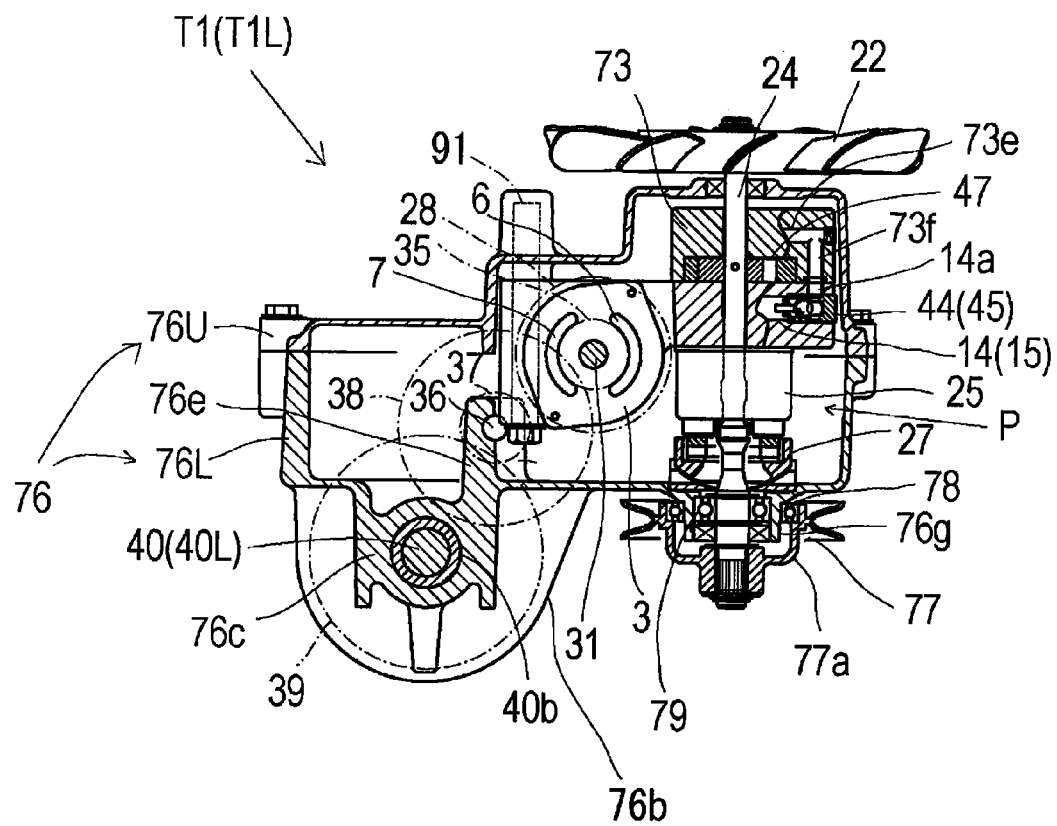
FIG. 25 is a sectional right side view of transaxle T1 showing an interior structure of a charge pump housing 73, a hydraulic pump P, a motor mounting surface 3 of center section 1 and a support structure supporting a proximal end of an axle 40.

As shown in FIGS. 24 and 25, a rear portion of lower housing half 76L behind pump shaft support portion 76g is expanded downward further than pump shaft support portion 76g so as to form left and right axle support portions 76a and 76c and a bull gear housing portion 76b between axle support portions 76a and 76c. Axle support potions 76a and 76c are provided for supporting axle 40, and bull gear housing portion 76b is provided for housing bull gear 39. Consequently, a space is provided horizontally sidewise from bull gear housing portion 76b and under the bottom surface of lower housing half 76L. The bottom end of pump shaft 24 with input pulley 77 is disposed in this space. Therefore, the bottom end of bull gear housing portion 76b serves as the lowest end of transaxle housing T1, so as to prevent the bottom end of pump shaft 24, input pulley 77 and belt 66 from projecting downward from the lowest end of transaxle T1, thereby protecting these exposed components, and thereby ensuring a sufficient ground clearance under the front portion of transaxle T1 in front of axle 40.

Pump shaft 24 projects at the upper portion thereof upward from the top of charge pump housing 73, and upward from the top of transaxle housing 76 (upper housing half 76U) so as to be fixedly provided thereon with cooling fan 22.

In transaxle T1, hydraulic motor M, deceleration gear train R and the brake device are disposed in transaxle housing 76, similar to those of transaxle T. In this regard, hydraulic motor M includes cylinder block 28 mounted on vertical motor mounting surface 3, deceleration gear train R including counter shaft 36 is interposed between motor shaft 31 and axle 40, and the brake device includes brake disc 32 fixed on motor shaft 31.

Figure 26:
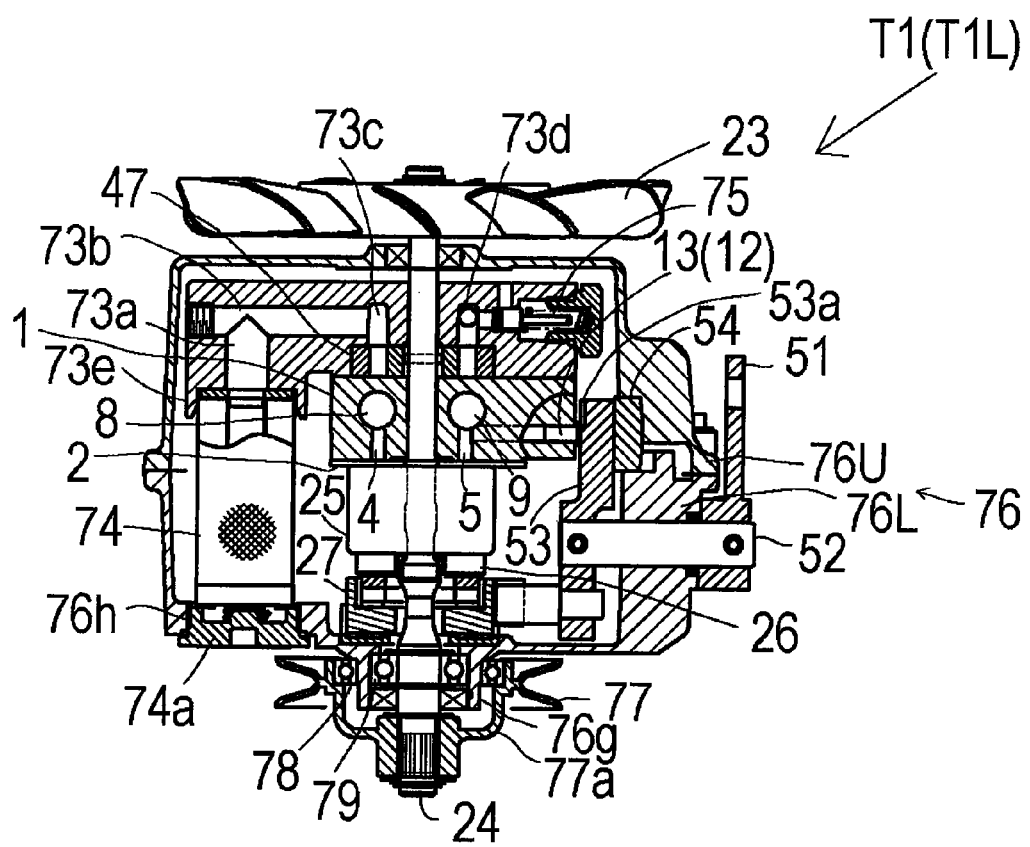
FIG. 26 is a sectional rear view of transaxle T1 showing interior structures of hydraulic pump P and charge pump housing 73 and a fluid filter 74.
Figure 27:
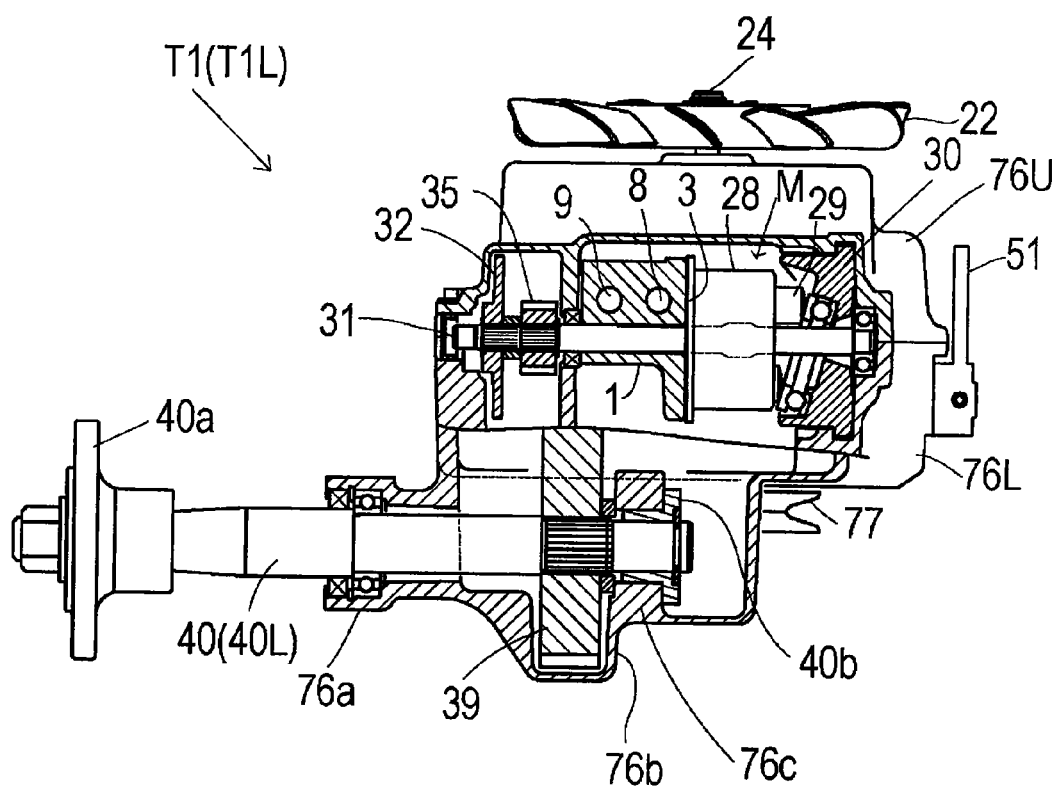
FIG. 27 is sectional rear view of transaxle T1 showing a hydraulic motor M and a support structure supporting axle 40.
Figure 28:
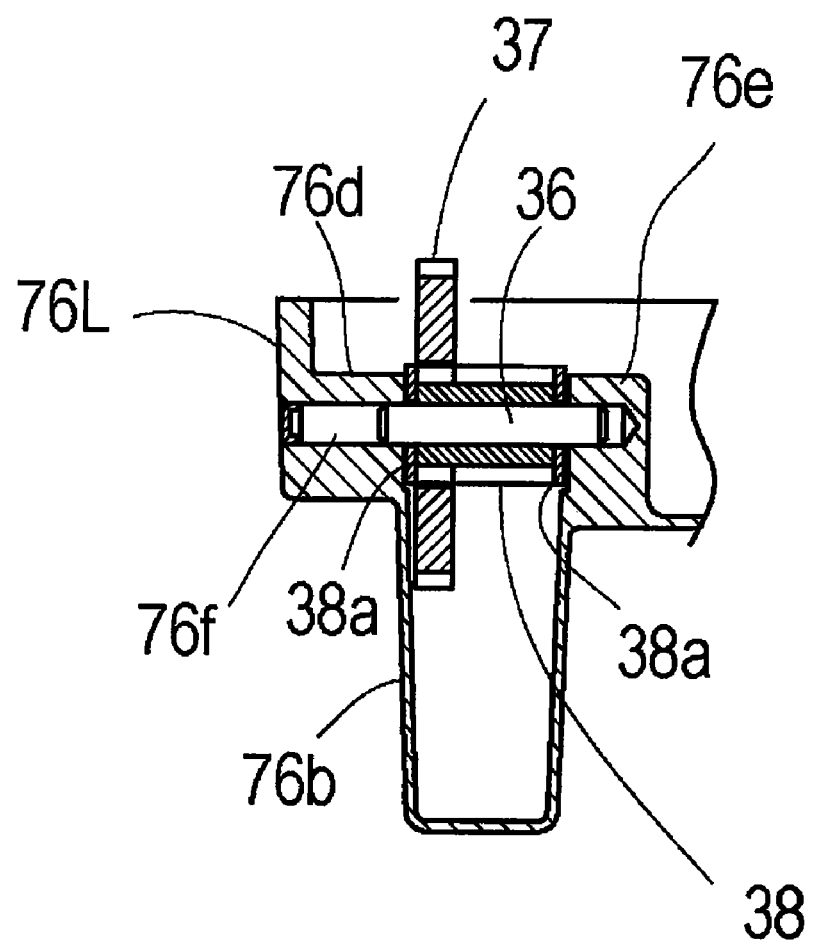
FIG. 28 is a fragmentary sectional rear view of transaxle T1 showing a support structure supporting a counter shaft 36.

As shown in FIGS. 24, 25 and 26, to support counter shaft 36, transaxle housing 76 (i.e., lower housing half 76L) is formed integrally with laterally outer and inner (i.e., left and right) opposite counter shaft support portions 76d and 76e projecting upward from a bottom portion thereof forward and upward from bull gear housing portion 76b. Left and right counter shaft support portions 76d and 76e are bored with respective laterally horizontal shaft holes 76f coaxial to each other. Shaft hole 76f of laterally outer (i.e., left) counter shaft support portion 76d has an outer (left) end opened outward at the outer (left) side surface of transaxle housing 76 (i.e., lower housing half 76L). Counter shaft 36 is inserted into shaft hole 76f of laterally outer (i.e., left) counter shaft support portion 76d through the open outer end of this shaft hole 76f, and is further inserted into shaft hole 76f of laterally inner (i.e., right) counter shaft support portion 76e, thereby being supported by left and right counter shaft support portions 76d and 76e. After the installation of counter shaft 36 into transaxle housing 76, the open outer end of shaft hole 76f of counter shaft support portion 76d is plugged. In the gap between left and right shaft holes 76f, small diameter gear 38 is fitted on counter shaft 36, a washer 38a is fitted on counter shaft 36 between counter shaft support portion 76d and the left end of small diameter gear 38, and another washer 38a on counter shaft 36 between counter shaft support portion 76e and the right end of small diameter gear 38. Large diameter gear 37 is relatively unrotatably fitted on a left portion of small diameter gear 38 and meshes with motor gear 35. A remaining right portion of small diameter gear 38 meshes with bull gear 39 disposed in bull gear housing portion 76b.

A bush 40b serving as a radial bearing is relatively rotatably fitted on the inner end of axle 40 (the right end of left axle 40L), and is fitted into a recess formed in axle support portion 76c of transaxle housing 76, thereby journaling the inner end of axle 40. Axle support portion 76a supports an axial intermediate portion of axle 40 through a bearing. Axle 40 projects outward (left axle 40L projects leftward) from axle support portion 76a.

Figure 29:
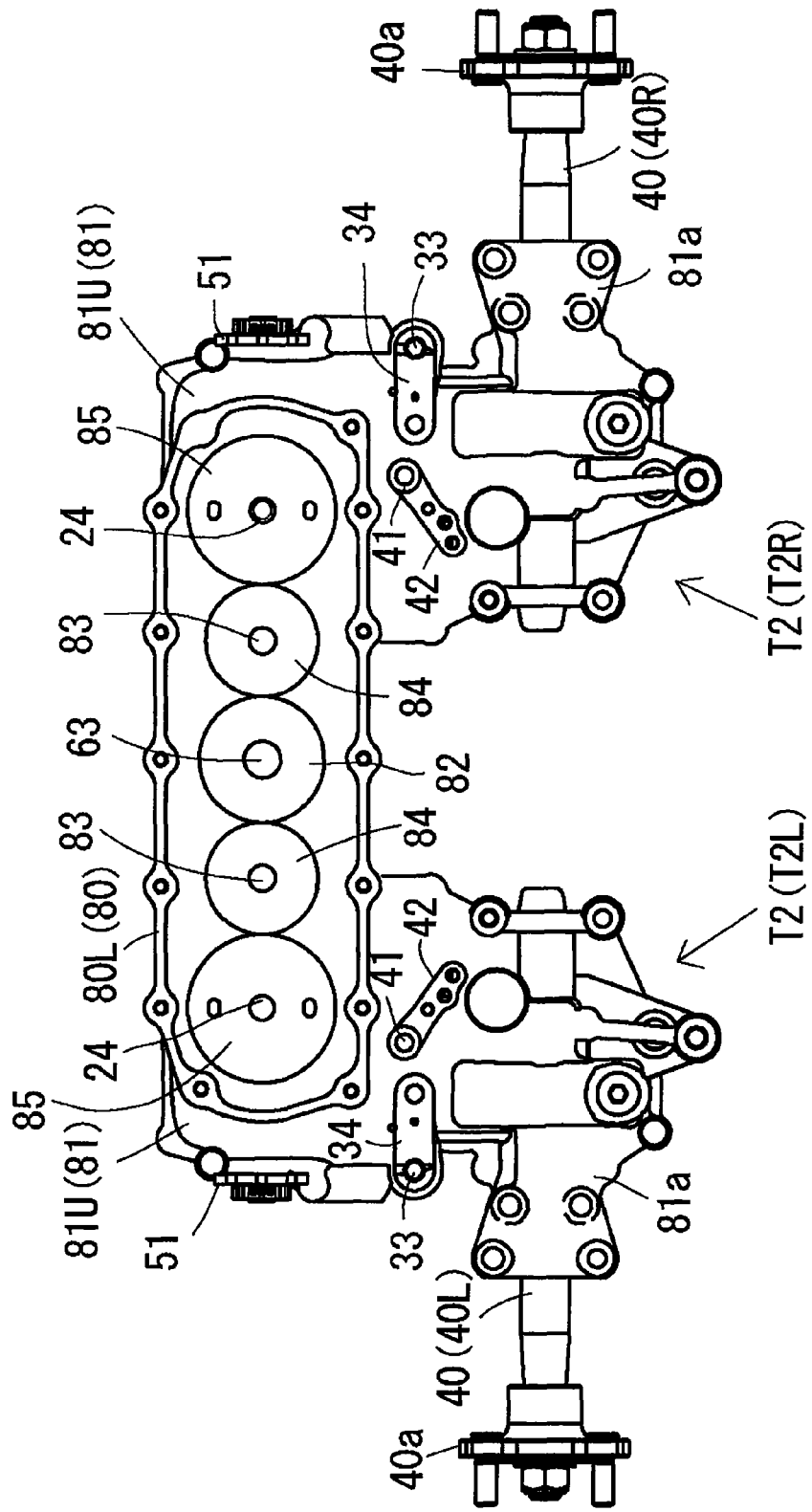
FIG. 29 is a plan view of a power transmission system including an engine, right and left transaxles T2 and a working device driving clutch unit, wherein a gear transmission drivingly connects the engine to right and left transaxles T2 and the working device driving clutch unit, an upper gear casing half having been removed.
Figure 30:
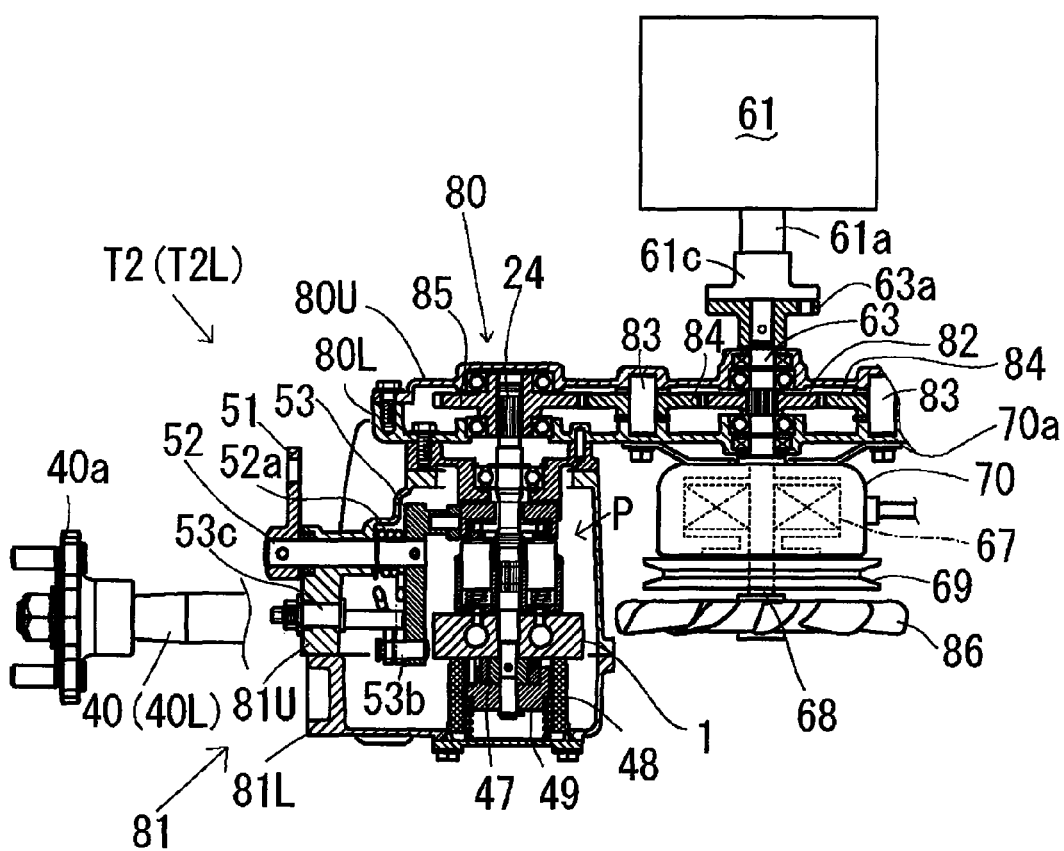
FIG. 30 is a fragmentary sectional rear view of the power transmission system of FIG. 29 showing a left transaxle T2L and the working device driving clutch unit.

Referring to FIGS. 29 and 30, description will be given of a power transmission system in which right and left transaxles T2R and T2L (transaxles T2 as a generic name) are combined with the working device driving clutch unit including clutch casing 71 incorporating clutch 67.

Each transaxle T2 includes a transaxle housing 81 which is constituted by joining and fastening an upper housing half 81U and a lower housing half 81L to each other by bolts. Transaxle housing 81 incorporates the HST including center section 1 and hydraulic pump P and motor M, axle 40 (right axle 40R or left axle 40L), and deceleration gear train R interposed between the HST and axle 40, similar to those of transaxle T.

In comparison with transaxles T or T1 provided with input pulleys 23 or 77 to be drivingly connected to engine 61 through the belt transmission, right and left transaxles T2R and T2L are spanned at top portions thereof with a gear casing 80 incorporating a gear train which drivingly connects both transaxles T2R and T2L to engine 61. Gear casing 80 is configured by joining an upper casing half 80U and a lower casing half 80L to each other through a horizontal joint surface. Lower casing half 80L is fastened at right and left bottom portions thereof onto the top ends of upper housing halves 81U of respective transaxle housings 81 of right and left transaxles T2R and T2L by bolts. Further, lower casing half 80L is fastened at a laterally central bottom portion thereof to a top portion of clutch casing 70 by bolts through a bracket 70a between right and left transaxles T2R and T2L.

Input shaft 63 projects upward from clutch casing 70, and further projects upward from gear casing 80 (i.e., upper casing half 80U) so as to be fixedly provided thereon with a flange 63a. Input shaft 63 is disposed coaxially to vertical engine output shaft 61a of engine 61. A flange 61c is fixed on a bottom end of engine output shaft 61a, and is joined to flange 63a. In this way, engine output shaft 61a and input shaft 63 are disposed coaxially to each other and are directly connected to each other so as to be rotatable integrally with each other. Therefore, the vertical gap between engine 61 and clutch casing 70 is shortened so as to reduce a loss of power transmitted to input shaft 63.

Upwardly projecting top portions of pump shafts 24 of respective transaxles T2 are journalled in gear casing 80. Further, in gear casing 80, right and left vertical counter shafts 83 are journalled, each counter shaft 83 being disposed between input shaft 63 and each pump shaft 24. In gear casing 80, a gear 82 is fixed on input shaft 63, gears 84 are fixed on respective counter shafts 83, and gears 85 are fixed on respective pump shafts 24. Gears 85 mesh with gear 83 through respective gears 84. In this way, the gear train is configured in gear casing 80 so as to distribute the rotary force of input shaft 63 receiving the power of engine 61 between right and left pump shafts 24 of respective transaxles T2.

A lower portion of output shaft 68 of clutch 67 projects downward from clutch casing 70 so as to be fixedly provided thereon with output pulley 69 and a cooling fan 86. Cooling fan 86 disposed between right and left transaxles T2R and T2L can efficiently cool both transaxles T2R and T2L.

As mentioned above, the power transmission system shown in FIGS. 29 and 30 is a compact assembly including engine 61, gear casing 80, clutch casing 70 and both transaxles T2R and T2L.

With regard to transaxle T2L shown in FIG. 30 representing right and left transaxles T2R and T2L, transaxle housing 81 incorporates a neutral returning mechanism for automatically returning movable swash plate 27 to its neutral position when speed control lever 51 is released from an operation force. In this regard, a neutral returning spring 52a is wound around control shaft 52. A retaining pin 53c is fixed to transaxle housing 81 (upper housing half 81U) so as to retain one end of spring 52a when control shaft 52 is rotated. A pushing pin 53b is fixed to relief groove plate 53 so as to push the other end of spring 52a according to rotation of control shaft 52. Therefore, when control shaft 52 is rotated so as to tilt movable swash plate 27 from its neutral position, spring 52a generates a force biasing movable swash plate 27 to its neutral position. Similarly, transaxle T or T1 normally includes such a neutral retuning mechanism.

It is further understood by those skilled in the art that the foregoing description is a preferred embodiment of the disclosed apparatus and that various changes and modifications may be made in the invention without departing from the scope thereof defined by the following claims.

What is claimed is:

1. A hydrostatic transmission comprising:
a hydraulic pump;
a hydraulic motor; and
a center section shaped to include:
    a pump mounting surface, onto which the hydraulic pump is mounted;
    a motor mounting surface, onto which the hydraulic motor is mounted, wherein the motor mounting surface is extended perpendicular to the pump mounting surface so that an imaginary extension surface from the motor mounting surface intersects the pump mounting surface;

first and second kidney ports opened at the pump mounting surface, wherein the first and second kidney ports are aligned opposite to each other and perpendicular to an extension direction of the imaginary extension surface so as to have the imaginary extension surface therebetween;

third and fourth kidney ports opened at the motor mounting surface, wherein the third and fourth kidney ports are aligned opposite to each other along the extension direction of the imaginary extension surface, and wherein the third kidney port is closer to the pump mounting surface than the fourth kidney port;

a first fluid passage interposed between the first and third kidney ports, wherein the first fluid passage has a first end joined to the first kidney port, and has a second end joined to the third kidney port, and wherein the entire first fluid passage between the first and second ends, when viewed to face the motor mounting surface, is straight and parallel to the pump mounting surface; and a second fluid passage interposed between the second and fourth kidney ports, wherein the second fluid passage has a third end joined to the second kidney port, and has a fourth end joined to the fourth kidney port, wherein the second fluid passage includes a straight portion extended parallel to the pump mounting surface and the motor mounting surface, and wherein a portion of the first fluid passage ranged along the motor mounting surface to the second end, when viewed to face the motor mounting surface, entirely overlaps the straight portion of the second fluid passage.

2. The hydrostatic transmission according to claim 1, further comprising:

a first neutral valve installed in the center section so as to be opened to the first fluid passage, wherein a portion of the second fluid passage between the third end and an end of the straight portion toward the third end is bent to avoid the first neutral valve when viewed to face the motor mounting surface; and a second neutral valve installed in the center section so as to be opened to the second fluid passage.

3. A transaxle including the hydrostatic transmission according to claim 1, comprising:

a housing incorporating the hydrostatic transmission, wherein the center section is arranged to have the pump mounting surface as a horizontal bottom surface thereof;

a vertical pump shaft of the hydraulic pump mounted onto the pump mounting surface, wherein the pump shaft is passed through the center section, and is extended downwardly outward from the housing so as to be provided thereon with a pulley for the driving connection of the hydraulic pump to a prime mover; and a charge pump housing incorporating a charge pump, wherein the charge pump housing is mounted onto an upper surface of the center section, wherein the pump shaft is extended into the charge pump housing so as to serve as a drive shaft of the charge pump, and wherein the charge pump housing is extended horizontally so as to form a filter support portion horizontally sidewise from the center section; and a fluid filter disposed in the housing and supported by the filter support portion of the charge pump housing.

4. A hydrostatic transmission comprising:
a hydraulic pump;
a hydraulic motor; and
a center section shaped to include:

a pump mounting surface, onto which the hydraulic pump is mounted;

a motor mounting surface, onto which the hydraulic motor is mounted, wherein the motor mounting surface is extended perpendicular to the pump mounting surface so that an imaginary extension surface from the motor mounting surface intersects the pump mounting surface;

first and second kidney ports opened at the pump mounting surface, wherein the first and second kidney ports are aligned opposite to each other and perpendicular to an extension direction of the imaginary extension surface so as to have the imaginary extension surface therebetween;

third and fourth kidney ports opened at the motor mounting surface, wherein the third and fourth kidney ports are aligned opposite to each other along the extension direction of the imaginary extension surface, and wherein the third kidney port is closer to the pump mounting surface than the fourth kidney port;

a first fluid passage interposed between the first and third kidney ports, wherein the first fluid passage has a first end joined to the first kidney port, and has a second end joined to the third kidney port;

a first straight portion of the first fluid passage, wherein the first straight portion has one end serving as the first end of the first fluid passage joined to the first kidney port, and is extended straight from the first end parallel to the pump mounting surface, and wherein the first straight portion slantingly intersects the imaginary extension surface when viewed to face the pump mounting surface;

a second straight portion of the first fluid passage, wherein the second straight portion has one end serving as the second end of the first fluid passage joined to the third kidney port, and is extended straight from the second end parallel to the pump mounting surface and the motor mounting surface;

a curved portion of the first fluid passage, wherein the curved portion is interposed between the other end of the first straight portion and the other end of the second straight portion, and wherein the entire first fluid passage between the first and second ends is doglegged at the curved portion when viewed to face the pump mounting surface, and is straight and parallel to the pump mounting surface when viewed to face the motor mounting surface;

a second fluid passage interposed between the second and fourth kidney ports, wherein the second fluid passage has a third end joined to the second kidney port, and has a fourth end joined to the fourth kidney port, and wherein the second straight portion of the first fluid passage, when viewed to face the pump mounting surface, is disposed between the third and fourth ends of the second fluid passage, so that the second straight portion and the third and fourth ends are aligned substantially straight;

a third straight portion of the second fluid passage, wherein the third straight portion is extended parallel to the pump mounting surface and the motor mounting surface, wherein the second straight portion of the first fluid passage is disposed between the third straight portion and the motor mounting surface, and wherein the second straight portion of the first fluid passage, when viewed to face the motor mounting surface, substantially entirely overlaps the third straight portion of the second fluid passage;

a first connection portion of the second fluid passage, wherein the first connection portion has one end serving as the third end of the second fluid passage joined to the second kidney port, and wherein the first connection portion is extended from the third end, and is curved to be joined to one end of the third straight portion when viewed to face the pump mounting surface; and a second connection portion of the second fluid passage, wherein the second connection portion has one end serving as the fourth end of the second fluid passage joined to the fourth kidney port, and wherein the second connection portion is extended from the fourth end, and is curved to be joined to the other end of the third straight portion.

5. The hydrostatic transmission according to claim 4, further comprising:

a first neutral valve installed in the center section so as to be opened to the first fluid passage, wherein the first neutral valve, when viewed to face the pump mounting surface, intersects the first connection portion of the second fluid passage, and wherein the first connection portion of the second fluid passage is bent to avoid the first neutral valve when viewed to face the motor mounting surface; and a second neutral valve installed in the center section so as to be opened to the second fluid passage.

6. A transaxle including the hydrostatic transmission according to claim 4, comprising:

a housing incorporating the hydrostatic transmission, wherein the center section is arranged to have the pump mounting surface as a horizontal bottom surface thereof;

a vertical pump shaft of the hydraulic pump mounted onto the pump mounting surface, wherein the pump shaft is passed through the center section, and is extended downwardly outward from the housing so as to be provided thereon with a pulley for the driving connection of the hydraulic pump to a prime mover; and a charge pump housing incorporating a charge pump, wherein the charge pump housing is mounted onto an upper surface of the center section, wherein the pump shaft is extended into the charge pump housing so as to serve as a drive shaft of the charge pump, and wherein the charge pump housing is extended horizontally so as to form a filter support portion horizontally sidewise from the center section; and a fluid filter disposed in the housing and supported by the filter support portion of the charge pump housing.

* * * * *